United States Patent
Shioiri et al.

(10) Patent No.: US 7,988,573 B2
(45) Date of Patent: Aug. 2, 2011

(54) DEVICE AND METHOD FOR CONTROLLING BELT-TYPE CONTINUOUSLY VARIABLE TRANSMISSION

(75) Inventors: Hiroyuki Shioiri, Susono (JP); Ryuji Ibaraki, Susono (JP); Hiroaki Kimura, Susono (JP); Yasuo Hojo, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1186 days.

(21) Appl. No.: 11/100,488

(22) Filed: Apr. 7, 2005

(65) Prior Publication Data

US 2005/0233842 A1  Oct. 20, 2005

(30) Foreign Application Priority Data

Apr. 14, 2004 (JP) ................................. 2004-119237

(51) Int. Cl.
*F16H 63/00* (2006.01)
(52) U.S. Cl. ................ 474/19; 474/18; 474/28
(58) Field of Classification Search ............ 701/58–60; 474/12, 18, 28
See application file for complete search history.

(56) References Cited

U.S. PATENT DOCUMENTS

| | | | | |
|---|---|---|---|---|
| 6,050,911 A * | 4/2000 | Feuchter et al. | ................. | 474/12 |
| 6,135,915 A | 10/2000 | Aoki et al. | | |
| 6,241,635 B1 * | 6/2001 | Schmid et al. | ................. | 474/11 |
| 6,336,879 B1 * | 1/2002 | Schmid et al. | ................. | 474/28 |
| 6,533,702 B1 * | 3/2003 | Asyama et al. | ................. | 477/45 |
| 2004/0127313 A1 * | 7/2004 | Shimanaka et al. | ............ | 474/18 |
| 2004/0171444 A1 * | 9/2004 | Yamamoto et al. | ............. | 474/28 |
| 2004/0214669 A1 * | 10/2004 | Katou et al. | ..................... | 474/28 |
| 2005/0070402 A1 * | 3/2005 | Kimura et al. | .................. | 477/46 |

FOREIGN PATENT DOCUMENTS

| | | |
|---|---|---|
| DE | 1 127 165 | 4/1962 |
| DE | 199 09 347 A1 | 9/1999 |
| DE | 100 63 772 A1 | 6/2002 |
| EP | 0 286 924 A1 | 10/1988 |
| EP | 1 403 565 A2 | 3/2004 |
| GB | 929 326 A | 6/1963 |
| JP | 57-61854 | 4/1982 |
| JP | 57-171155 | 10/1982 |
| JP | 62-67359 | 3/1987 |
| JP | 62 067359 A | 3/1987 |
| JP | 62-67360 | 3/1987 |
| JP | 64-12960 | 1/1989 |
| JP | 3-204438 | 9/1991 |
| JP | 9-303541 | 11/1997 |
| JP | 2004-84755 | 3/2004 |
| WO | WO 98/42531 | 10/1998 |

* cited by examiner

*Primary Examiner* — Michael R Mansen
*Assistant Examiner* — Robert T Reese
(74) *Attorney, Agent, or Firm* — Oblon, Spivak, McClelland, Maier & Neustadt, L.L.P.

(57) ABSTRACT

A control device includes an arrangement for deriving an input torque input to a belt-type continuously variable transmission based on a control amount of a first actuator. The continuously variable transmission includes a first actuator that is provided on a one movable sheave side, that presses the one movable sheave toward one fixed sheave, and that can generate a belt pinching pressure on the one movable sheave side, and a second actuator and a torque cam that are provided on the other movable sheave side, that press the other movable sheave toward the other fixed sheave, and that can generate a belt pinching pressure on the other movable sheave side.

18 Claims, 16 Drawing Sheets

FIG.8

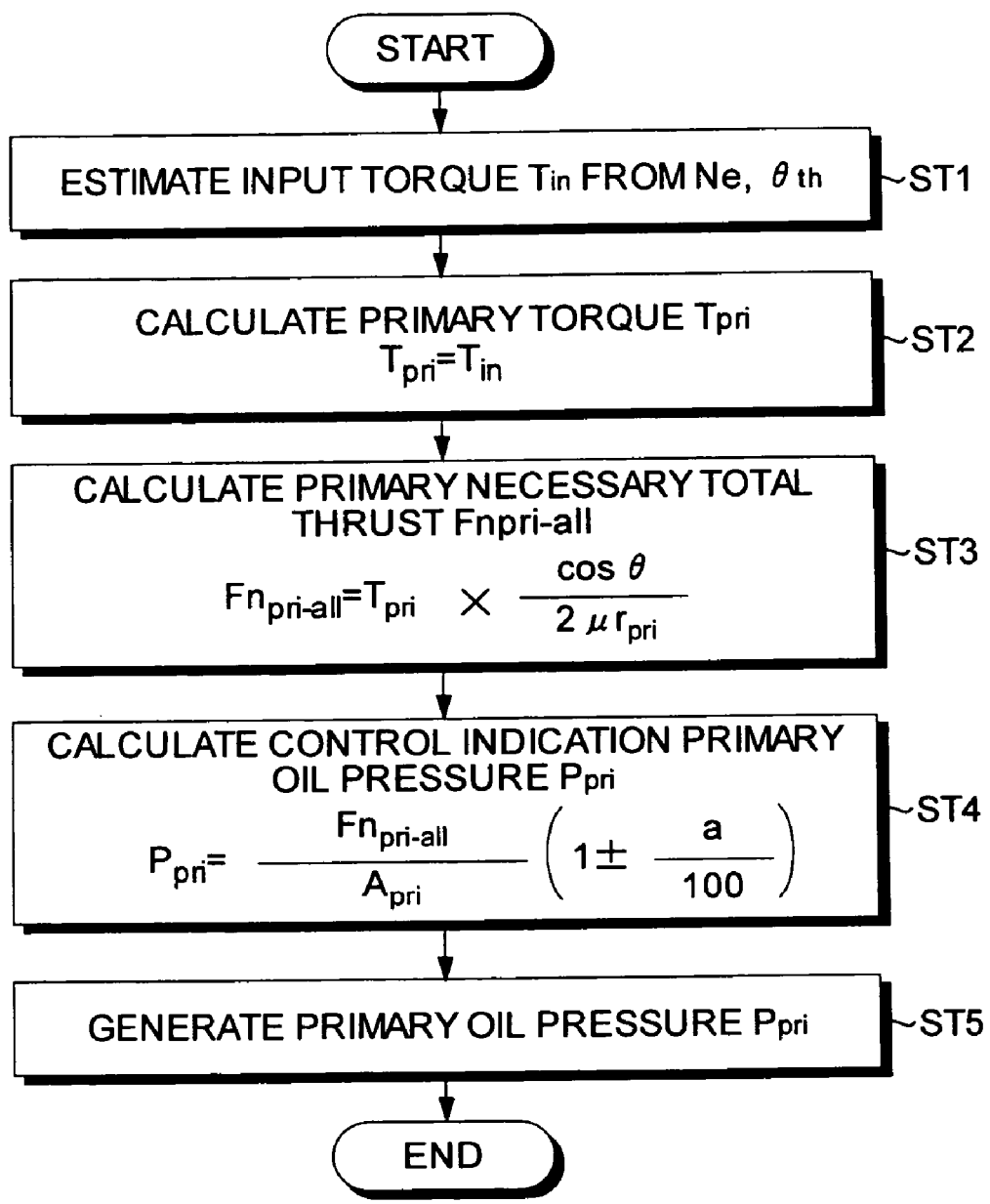

START
↓
ESTIMATE INPUT TORQUE $T_{in}$ FROM $N_e$, $\theta_{th}$ — ST1
↓
CALCULATE PRIMARY TORQUE $T_{pri}$
$T_{pri} = T_{in}$ — ST2
↓
CALCULATE PRIMARY NECESSARY TOTAL THRUST $Fn_{pri\text{-}all}$
$$Fn_{pri\text{-}all} = T_{pri} \times \frac{\cos\theta}{2\mu r_{pri}}$$
— ST3
↓
CALCULATE CONTROL INDICATION PRIMARY OIL PRESSURE $P_{pri}$
$$P_{pri} = \frac{Fn_{pri\text{-}all}}{A_{pri}} \left(1 \pm \frac{a}{100}\right)$$
— ST4
↓
GENERATE PRIMARY OIL PRESSURE $P_{pri}$ — ST5
↓
END

DEVICE AND METHOD FOR CONTROLLING BELT-TYPE CONTINUOUSLY VARIABLE TRANSMISSION

BACKGROUND OF THE INVENTION

1) Field of the Invention

The present invention relates to a belt-type continuously variable transmission control device having an actuator on each of a primary pulley and a secondary pulley for generating a belt pinching pressures.

2) Description of the Related Art

Generally, a belt-type continuously variable transmission (CVT) includes two rotary shafts arranged in parallel, a primary pulley and a secondary pulley attached to the respective shafts, and a belt wound on V grooves of each of the primary pulley and the secondary pulley. Each of the primary pulley and the secondary pulley includes a fixed sheave, which is conical and fixed to the corresponding rotary shaft, and a movable sheave, which is also conical but slides on the rotary shaft in an axial direction. The V groove is formed by inclined parts of the fixed sheave and the movable sheave that are opposed to each other.

The belt-type CVT of this type causes the contact radii of the belt in contact with the primary pulley and the secondary pulley to continuously change. Moreover, a gear ratio γ is continuously changed by sliding the movable sheave on the rotary shaft and by changing a width of the V groove of the pulley. The gear ratio γ is a ratio of the contact radius of the belt in contact with the primary pulley to that of the belt in contact with the secondary pulley. In other words, it is possible to continuously and variably change the gear ratio γ by controlling the groove width of only the primary pulley.

Thus, it is necessary to slide the movable sheave on the rotary shaft to change the gear ratio γ. Therefore, a mechanism (a movable sheave sliding mechanism) that slides the movable sheave of the primary pulley becomes necessary. An exemplary movable sheave sliding mechanism slides the movable sheave with a motor such as an electric motor or a hydraulic motor.

This belt-type CVT is also equipped with a pressure mechanism (an actuator) that presses the movable sheave against the fixed sheave and that generates a belt pinching pressure so as to keep the gear ratio γ and to prevent slippage of the belt on the pulleys. An exemplary pressure mechanism generates the belt pinching pressure by oil pressure or air pressure within a cylinder provided on a rear surface of the movable sheave (a surface thereof opposite to the V groove). Another exemplary pressure mechanism generates the belt pinching pressure by a torque cam provided on the rear surface of the movable sheave. A belt-type CVT with a pressure mechanism is disclosed in, for example, Japanese Utility Model Application Laid-Open No. S64-12960.

The pressure mechanism generates the belt pinching pressure by appropriately changing the oil pressure depending on a torque input to the belt-type CVT.

The torque input to the belt-type CVT can be the torque of an internal combustion engine that is stored in advance corresponding to the driving conditions. However, the problem is that the torque stored is not always same as the actual torque output from the internal combustion engine. This is due to the fluctuations in the characteristics of the internal combustion engine. If the torque stored is same as the actual torque, the belt pinching-pressure generated is in error, that is, the belt pinching pressure cannot be controlled appropriately.

It is an object of the preset invention to provide a belt-type continuously variable transmission control device that can input an accurate torque to a pressure mechanism of the belt-type CVT.

SUMMARY OF THE INVENTION

It is an object of the preset invention to provide a control device and a control method that can input an accurate torque to a pressure mechanism of a belt-type CVT.

According to an aspect of the present invention, a control device controls a belt-type continuously variable transmission that includes two pulley shafts arranged in parallel at a predetermined distance; movable sheaves arranged on the pulley shafts and slidable on corresponding pulley shaft in axial directions of the pulley shafts, respectively; fixed sheaves arranged on corresponding pulley shaft to face corresponding movable sheave so as to form grooves between the fixed sheaves and the movable sheaves, respectively; a belt wound on the grooves between the movable sheaves and the fixed sheaves facing one another; a first actuator that is provided to one of the movable sheaves so as to press the one movable sheave toward corresponding one of the fixed sheaves to generate a belt pinching pressure on the one movable sheave; and a second actuator and a torque cam that are provided to other movable sheave so as to press the other movable sheave toward the other fixed sheave to generate a belt pinching pressure on the other movable sheave. The control device includes an input torque deriving arrangement that derives an input torque to be input to the belt-type continuously variable transmission based on a control amount of the first actuator.

Moreover, in the control device, the input torque deriving arrangement calculates a thrust of the other movable sheave based on the control amount of the first actuator, calculates a thrust of the torque cam from the thrust of the other movable sheave and a thrust of the second actuator calculated based on a control amount of the second actuator, calculates a torque cam transmission torque from the thrust of the torque cam and data on the torque cam, and deriving the input torque based on the torque cam transmission torque.

Furthermore, in the control device, the input torque deriving arrangement calculates a thrust of the other movable sheave based on the control amount of the first actuator, calculates a thrust of the torque cam from the thrust of the other movable sheave and a thrust of the second actuator calculated based on a control amount of the second actuator, calculates a torque cam transmission torque from the thrust of the torque cam and data on the torque cam, derives the input torque based on the torque cam transmission torque, and updates the input torque as a new input torque.

Moreover, in the control device, the input torque deriving arrangement calculates a thrust of the other movable sheave based on the control amount of the first actuator, calculates a thrust of the torque cam from the thrust of the other movable sheave and a thrust of the second actuator calculated based on the control amount of the second actuator, calculates a torque cam transmission torque from the thrust of the torque cam and data on the torque cam, and derives the input torque based on the torque cam transmission torque. The control device further includes an actuator control arrangement that controls the control amounts of the first actuator and the second actuator based on the input torque calculated by the input torque deriving arrangement.

Furthermore, in the control device, the input torque deriving arrangement calculates a thrust of the one movable sheave by adding up a thrust of the first actuator generated by an applied oil pressure and a centrifugal oil pressure caused by a hydraulic oil within the first actuator, calculates a thrust of the other movable sheave by multiplying the thrust of the one movable sheave by a ratio according to a gear ratio of the thrust of the other movable sheave to the thrust of the one movable sheave, calculates a thrust of the torque cam from the thrust of the other movable sheave and a thrust of the second actuator calculated based on the oil pressure within the second actuator, calculates a torque cam transmission torque from the thrust of the torque cam and data on the torque cam, and derives the input torque based on the torque cam transmission torque and the gear ratio.

Moreover, in the control device, the input torque deriving arrangement controls a control amount of the second actuator so that the second actuator does not press the other movable sheave when a gear ratio is equal to a predetermined gear ratio, calculates a thrust of the torque cam responsible for generation of the belt pinching pressure on the other movable sheave based on the control amount of the first actuator, calculates a torque cam transmission torque from the thrust of the torque cam and data on the torque cam, and derives the input torque based on the torque cam transmission torque.

Furthermore, in the control device, the input torque deriving arrangement controls a control amount of the second actuator so that the second actuator does not press the other movable sheave when a gear ratio is equal to a predetermined gear ratio, calculates a thrust of the torque cam responsible for generation of the belt pinching pressure on the other movable sheave based on the control amount of the first actuator, calculates a torque cam transmission torque from the thrust of the torque cam and data on the torque cam, derives the input torque based on the torque cam transmission torque, and updates the input torque as a new input torque.

Furthermore, in the control device, the input torque deriving arrangement controls a control amount of the second actuator so that the second actuator does not press the other movable sheave when a gear ratio is equal to a predetermined gear ratio, calculates a thrust of the one movable sheave by adding up a thrust of the first actuator generated by an applied oil pressure and a centrifugal oil pressure caused by a hydraulic oil within the first actuator, calculates a thrust of the other movable sheave by multiplying the thrust of the one movable sheave by a ratio according to a gear ratio of the thrust of the other movable sheave to the thrust of the one movable sheave, calculates a thrust of the torque cam responsible for generation of the belt pinching pressure on the other movable sheave side by subtracting the centrifugal oil pressure caused by the hydraulic oil within the second actuator from the thrust of the other movable sheave, calculates a torque cam transmission torque from the thrust of the torque cam and data on the torque cam, and derives the input torque based on the torque cam transmission torque.

Furthermore, the control device further includes an actuator control arrangement that controls control amounts of the first actuator and the second actuator based on the input torque calculated by the input torque deriving arrangement.

According to another aspect of the present invention, a control device controls a belt-type continuously variable transmission that includes two pulley shafts arranged in parallel at a predetermined distance; movable sheaves arranged on the pulley shafts and slidable on corresponding pulley shaft in axial directions of the pulley shafts, respectively; fixed sheaves arranged on corresponding pulley shaft to face corresponding movable sheave so as to form grooves between the fixed sheaves and the movable sheaves, respectively; a belt wound on the grooves between the movable sheaves and the fixed sheaves facing one another; a first actuator that is provided to one of the movable sheaves so as to press the one movable sheave toward corresponding one of the fixed sheaves; and a second actuator and a torque cam that are provided to other movable sheave so as to press the other movable sheave toward the other fixed sheave. The control device includes an arrangement that controls at least one of a control amount of the first actuator and a control amount of the second actuator based on the control amount of the first actuator.

Furthermore, the control device further includes an actuator control arrangement that calculates a necessary total thrust necessary for the one movable sheave based on the input torque calculated by the input torque deriving arrangement, and controls the control amount of the first actuator and a control amount of the second actuator based on the control amount of the first actuator that generates the necessary total thrust.

Moreover, the control device further includes an actuator control arrangement that calculates a necessary total thrust necessary for the one movable sheave based on the input torque calculated by the input torque deriving arrangement and a frictional force between each of the one movable sheave and the fixed sheave and the belt, and controls the control amount of the first actuator and a control amount of the second actuator based on the control amount of the first actuator that generates the necessary total thrust.

Furthermore, the control device further includes an actuator control arrangement that calculates a necessary total thrust necessary for the other movable sheave and a thrust of the torque cam based on the input torque calculated by the input torque deriving arrangement, calculates a thrust of the second actuator from the necessary total thrust and the thrust of the torque cam, and controls the control amount of the first actuator and a control amount of the second actuator based on the control amount of the second actuator that generates the thrust of the second actuator.

A method according to still another aspect of the present invention is a method of controlling a belt-type continuously variable transmission that includes two pulley shafts arranged in parallel at a predetermined distance; movable sheaves arranged on the pulley shafts and slidable on corresponding pulley shaft in axial directions of the pulley shafts, respectively; fixed sheaves arranged on corresponding pulley shaft to face corresponding movable sheave so as to form grooves between the fixed sheaves and the movable sheaves, respectively; a belt wound on the grooves between the movable sheaves and the fixed sheaves facing one another; a first actuator that is provided to one of the movable sheaves so as to press the one movable sheave toward corresponding one of the fixed sheaves to generate a belt pinching pressure on the one movable sheave; and a second actuator and a torque cam that are provided to other movable sheave so as to press the other movable sheave toward the other fixed sheave to generate a belt pinching pressure on the other movable sheave. The method includes deriving an input torque to be input to the belt-type continuously variable transmission based on a control amount of the first actuator.

Moreover, in the method the deriving includes calculating a thrust of the other movable sheave based on the control amount of the first actuator, calculating a thrust of the torque cam from the thrust of the other movable sheave and a thrust of the second actuator calculated based on a control amount of the second actuator, calculating a torque cam transmission torque from the thrust of the torque cam and data on the torque cam, and deriving the input torque based on the torque cam transmission torque.

Furthermore, in the method, the deriving includes calculating a thrust of the other movable sheave based on the control amount of the first actuator, calculating a thrust of the torque cam from the thrust of the other movable sheave and a thrust of the second actuator calculated based on a control amount of the second actuator, calculating a torque cam transmission torque from the thrust of the torque cam and data on the torque cam, deriving the input torque based on the torque cam transmission torque, and updating the input torque as a new input torque.

Moreover, in the method, the deriving includes controlling a control amount of the second actuator so that the second actuator does not press the other movable sheave when a gear ratio is equal to a predetermined gear ratio, calculating a thrust of the torque cam responsible for generation of the belt pinching pressure on the other movable sheave based on the control amount of the first actuator, calculating a torque cam transmission torque from the thrust of the torque cam and data on the torque cam, and deriving the input torque based on the torque cam transmission torque.

Furthermore, the method further includes controlling control amounts of the first actuator and the second actuator based on the input torque calculated by the input torque deriving arrangement.

A method according to still another aspect of the present invention is a method of controlling a belt-type continuously variable transmission that includes two pulley shafts arranged in parallel at a predetermined distance; movable sheaves arranged on the pulley shafts and slidable on corresponding pulley shaft in axial directions of the pulley shafts, respectively; fixed sheaves arranged on corresponding pulley shaft to face corresponding movable sheave so as to form grooves between the fixed sheaves and the movable sheaves, respectively; a belt wound on the grooves between the movable sheaves and the fixed sheaves facing one another; a first actuator that is provided to one of the movable sheaves so as to press the one movable sheave toward corresponding one of the fixed sheaves; and a second actuator and a torque cam that are provided to other movable sheave so as to press the other movable sheave toward the other fixed sheave. The method includes controlling at least one of a control amount of the first actuator and a control amount of the second actuator based on the control amount of the first actuator.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 8 is a flowchart for explaining a primary oil pressure generation operation according to the first embodiment;

DETAILED DESCRIPTION

Figure 1:
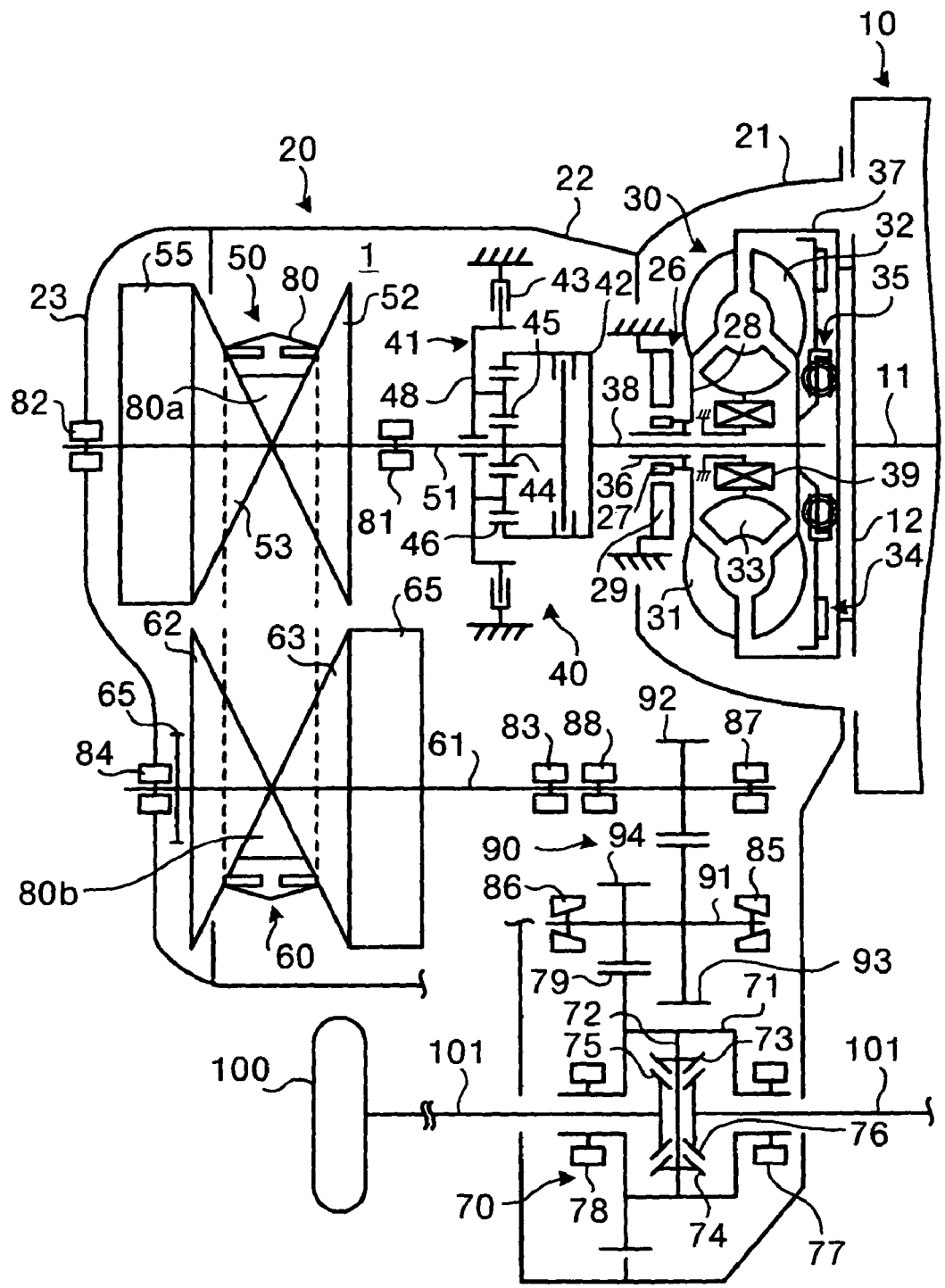
FIG. 1 is a skeleton diagram of an overall configuration of a power transmission device that includes a control device according to an embodiment of the present invention.

Exemplary embodiments of the present invention are explained in detail with reference to the accompanying drawings. The embodiments are not intended to limit the present invention.

A control device for a belt-type CVT according to a first embodiment of the present invention is explained below with reference to FIGS. 1 to 16.

An overall configuration of a typical power transmission device that includes a belt-type CVT is first explained below with reference to FIG. 1. The power transmission device includes an internal combustion engine 10 and a transaxle 20 arranged on an output side of the internal combustion engine 10.

The transaxle 20 includes a transaxle housing 21 attached to the internal combustion engine 10, a transaxle case 22 attached to the transaxle housing 21, and a transaxle rear cover 23 attached to the transaxle case 22, which are arranged in this order from the output side of the internal combustion engine 10. These elements constitute a casing of the power transmission device as a whole.

A torque converter (starting device) 30 is accommodated in the transaxle housing 21. The torque converter 30 increases a torque of the internal combustion engine 10 and transmits the increased torque to the belt-type CVT 1 to be explained later. The torque converter 30 includes pump impellers 31, turbine liners 32, a stator 33, a lockup clutch 34, a damper device 35, and the like.

An input shaft 38 rotatable about an equal axis to that of a crank shaft 11 of the internal combustion engine 10 is provided in the transaxle housing 21. To an internal combustion engine 10—side end of the input shaft 38 is attached the turbine liners 32 and the lockup clutch 34 through the damper device 35.

A front cover 37 of the torque converter 30 is coupled to a transaxle 20—side end of the crank shaft 11 through a drive plate 12, and the pump impellers 31 are connected to the front cover 37.

Each pump impeller 31 is arranged to face the corresponding turbine liner 32, and the stator 33 is disposed inside the pump impeller 31 and the turbine liner 32. A hollow shaft 36 is connected to the stator 33 through a one-way clutch 39, and the input shaft 38 is disposed in this hollow shaft 36.

A hydraulic oil is supplied into a casing (not shown) formed by the front cover 37, the pump impellers 31, and the like.

Operations of the torque converter 30 will next be explained.

An output torque Te of the internal combustion engine 10 is transmitted to the front cover 37 through the drive plate 12. If the lockup clutch 34 is unlocked by the damper device 35, the torque transmitted to the front cover 37 is transmitted to the pump impellers 31, and further transmitted to the turbine liners 32 through the hydraulic oil circulating between the pump impellers 31 and the turbine liners 32. The torque transmitted to the turbine liners 32 is transmitted to the input shaft 38.

An oil pump (a hydraulic pump) 26 (see FIG. 1) is provided between the torque converter 30 and a forward and backward motion switching mechanism 40 to be explained later. The oil pump 26 is connected to each pump impeller 31 by a rotor 27 through a cylindrical hub 28. Further, a body (casing) 29 is fixed to the transaxle case 22. The hub 28 is spline-fitted into the hollow shaft 36. By so constituting the power transmission device, a power of the internal combustion engine 10 is transmitted to the rotor 27 through the pump impellers 31, thereby driving the oil pump 26.

The forward and backward motion switching mechanism 40, the belt-type CVT 1, and a final reduction gear 70 serving as a differential gear are contained in the transaxle case 22 and the transaxle rear cover 23.

The forward and backward motion switching mechanism 40 transmits the output torque Te of the internal combustion engine 10 transmitted to the input shaft 38 within the torque converter 30, to a primary pulley 50, to be explained later, of the belt-type CVT 1. The forward and backward motion switching mechanism 40 a planetary gear mechanism 41, a forward clutch 42, and a backward brake 43.

The planetary gear mechanism 41 includes a sun gear 44, a pinion (planetary pinion) 45, and a ring gear 46.

The sun gear 44 is spline-fitted into a coupling member (not shown). The coupling member is spline-fitted into a primary shaft 51 that serves as a rotary shaft of the primary pulley 50. By thus constituting the forward and backward motion switching mechanism 40, the torque transmitted to the sun gear 44 is transmitted to the primary shaft 51.

A plurality of (e.g., three) pinions 42 are arranged around and engaged with the sun gear 44. The respective pinions 42 are held by a carrier 48 that supports the pinions 42 so that the pinions 42 can rotate on their axes and so that the pinions 42 can integrally revolve round the sun gear 44. This carrier 48 is connected to the backward brake 43 on its outer peripheral end.

The ring gear 46 is engaged with the respective pinions 42 held by the carrier 48, and connected to the input shaft 38 within the torque converter 30 through the forward clutch 42.

The forward clutch 42 is controlled to be turned on and off by the hydraulic oil supplied to a hollow portion of the input shaft 38. A brake piston (not shown) is employed for this ON/OFF control over the forward clutch 42. During a forward motion, the forward clutch 42 is turned on and the backward brake 43 is turned off. During a backward motion, the forward clutch 42 is turned off and the backward brake 43 is turned on.

A schematic configuration of the belt-type CVT 1 will next be explained.

The belt-type CVT 1 includes the primary shaft (primary pulley shaft) 51 arranged to be concentric with the input shaft 38, and a secondary shaft (secondary pulley shaft) 61 arranged to be parallel to the primary shaft 51 at a predetermined distance from the primary shaft 51. The primary shaft 51 is rotatably supported by bearings 81 and 82 shown in FIG. 1. The secondary shaft 61 is rotatably supported by bearings 83 and 84 shown in FIG. 1.

The primary shaft 51 is provided with the primary pulley 50 shown in FIG. 1. The primary pulley 50 includes a fixed sheave 52 arranged integrally on an outer periphery of the primary shaft 51, and a movable sheave 53 slidable in an axial direction of the primary shaft 51.

Figure 2:
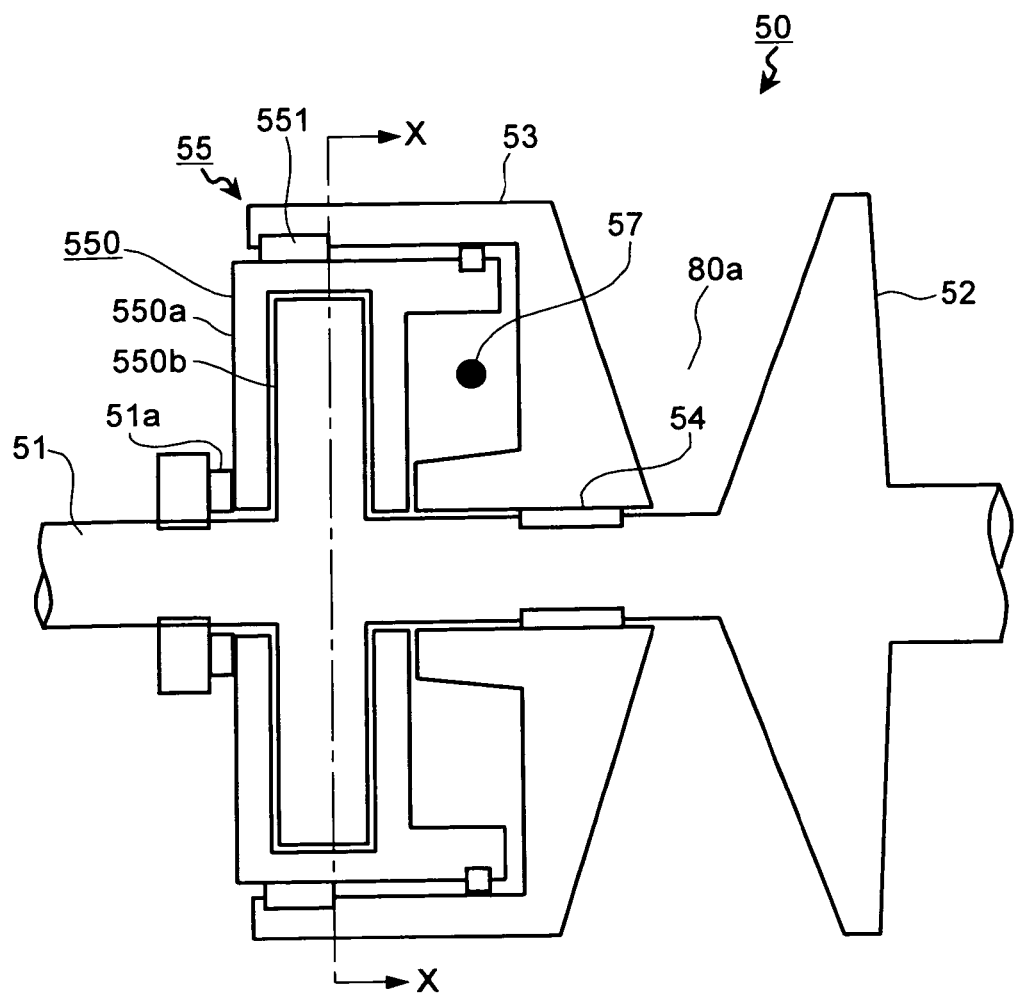
FIG. 2 is an exemplary configuration of a primary pulley of a belt-type CVT that is to be controlled by a control device according to a first embodiment of the present invention.

The movable sheave 53 is spline-fitted into the primary shaft 51 by a spline 54 shown in FIG. 2. A V groove 80a is formed between opposing surfaces of the fixed sheave 52 and the movable sheave 53.

This primary shaft 51 is also provided with a movable sheave sliding mechanism 55 that slides the movable sheave 53 in the axial direction of the primary shaft 51 to make the movable sheave 53 close to or far from the fixed sheave 52. The movable sheave sliding mechanism 55 according to the first embodiment will now be explained in detail.

As shown in FIG. 2, the movable heave sliding mechanism 55 includes a hydraulic motor 550 that serves as a driving source for sliding the movable sheave 53 in the axial direction of the primary shaft 51, and a motion direction conversion mechanism 551 that converts a driving force (a force in a rotational direction) of the hydraulic motor 550 into a force in a sliding direction of the movable sheave 53.

Figure 3:
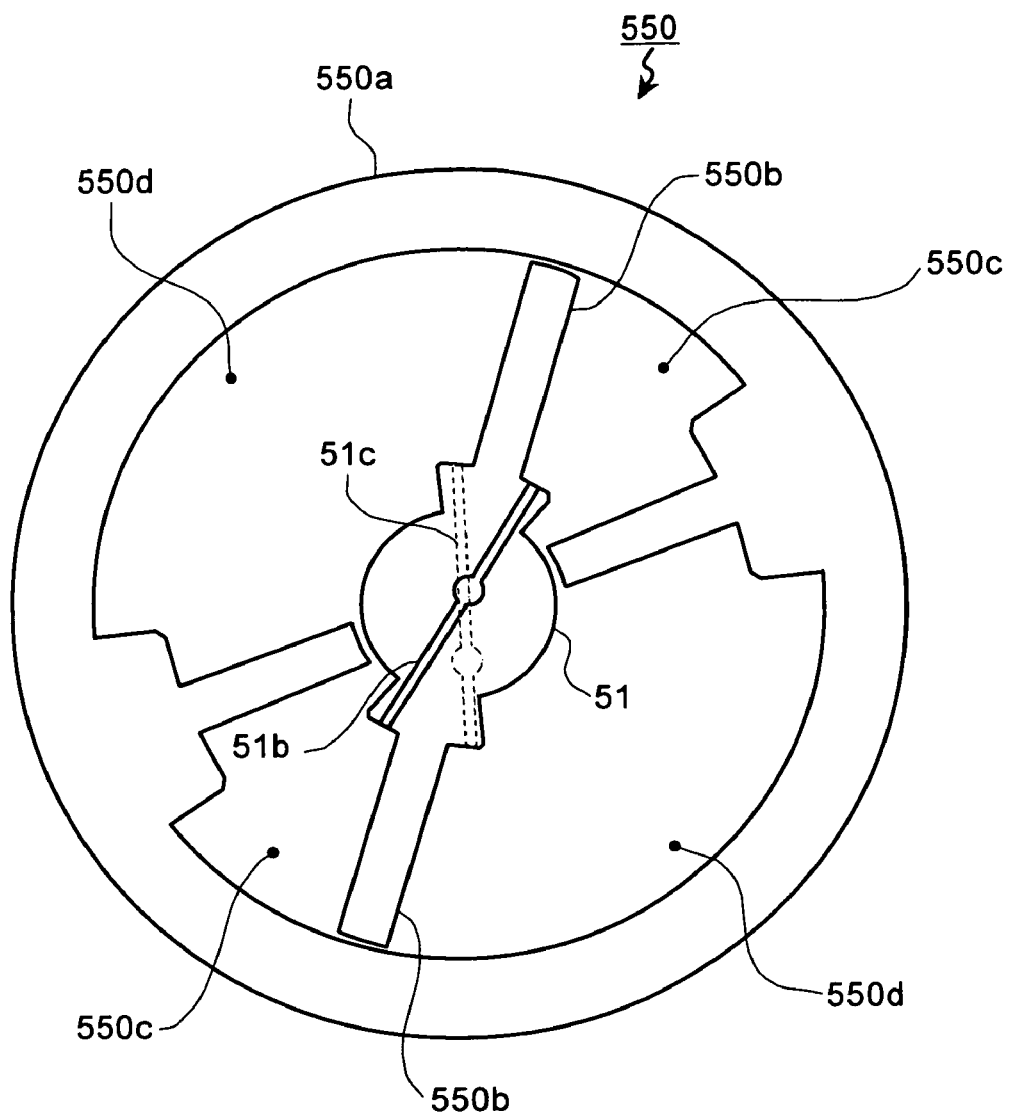
FIG. 3 is a cross section of a hydraulic motor shown in FIG. 2.

As the hydraulic motor 550, a motor configured to use a rotation of an outer rotor generated by a relative rotation of the outer rotor to an inner rotor as a driving force is employed. As shown in FIG. 3, for example, a so-called vane motor that includes an outer rotor 550a and vanes 550b serving as the inner rotor, and that rotates the outer rotor 550a by the hydraulic oil flowing into first oil chambers 550c (or second oil chambers 550d) formed between the outer rotor 550a and the inner rotor 550b is employed as the hydraulic motor 550. The vanes 550b are formed integrally with the primary shaft 51.

The outer rotor 550a is arranged to be located in a space portion of the movable sheave 53 opposite to the groove 80a and to be concentric with the primary shaft 51. The outer rotor 550a can rotate on its rotary shaft relatively to the primary shaft 51 by interposing a bearing 51a shown in FIG. 2 rotatable with the primary shaft 51 between the outer rotor 550a and the primary shaft 51.

As shown in FIG. 2, an outer periphery of the outer rotor 550a is attached to an inner wall surface of the space portion of the movable sheave 53 through the motion direction conversion mechanism 551. For example, a so-called motion screw, such as a multiple-start screw or a slide screw, which converts the rotation force of the outer rotor 550a into a force in the axial direction of the outer rotor 550a is employed as the motion direction conversion mechanism 551 of the first embodiment. By using the mechanism 551, a high thrust can be generated only by a relatively low torque, and the output (torque) of the hydraulic motor 550 can be reduced. Thus, the oil pressure can be reduced to improve efficiency and the hydraulic motor 550 can be made smaller.

The motion direction conversion mechanism 551 rotates the outer rotor 550a and the movable sheave 53 integrally with each other in the rotational direction of the primary shaft 51. The motion direction conversion mechanism 551 can, therefore, act as an integral rotation mechanism that rotates the hydraulic motor 550 integrally with the movable sheave 53.

The bearing 51a and the motion direction conversion mechanism 551 constitute a relative movement mechanism that enables a relative movement of the hydraulic motor 550 and the movable sheave 53 to each other. If the outer rotor 550a rotates, for example, a rotation force (torque) of the outer rotor 550a is converted into a thrust of the hydraulic motor 550 for sliding the movable sheave 53 through the motion direction conversion mechanism 551. A reactive force to this thrust is applied to the bearing 51a. However, since the bearing 51a is fixed to the primary shaft 51, the outer rotor 550a is not moved excessively in a direction of the reactive force. As a result, the movable sheave 53 is moved relatively to the hydraulic motor 550, and closer to the fixed sheave 52. By thus rotating the outer rotor 550a, the movable sheave 53 can slide in the axial direction of the primary shaft 51.

Since the bearing 51a is fixed to the primary shaft 51, the primary shaft 51 can receive the reactive force to the thrust of the hydraulic motor 550 through the bearing 51a. Besides, the relative rotation of the outer rotor 550a to the primary shaft 51 is restricted by a stroke of the movable sheave 53 in the sliding direction. According to the first embodiment, therefore, stationary elements such as the transaxle case 22 and the transaxle rear cover 23 do not receive the reactive force, and a rotational motion of the bearing 51a hardly occurs. A loss due to the bearing 51a can, therefore, be reduced.

The vanes 550b of the hydraulic motor 550 are provided integrally with the primary shaft 51. Therefore, the outer rotor 550a of the hydraulic motor 550 rotates at an equal number of revolutions to that of the primary shaft 51 if the rotation of the hydraulic motor 550 is stopped, and rotates at a different number of revolutions from that of the primary shaft 51 if the relative rotation occurs between the outer rotor 550a and the vanes 550b.

As shown in FIG. 3, oil passages 51b and 51c are formed in the primary shaft 51 (or vanes 550b). The oil passage 51b communicates with the first oil chambers 550c, and supplies or discharges the hydraulic oil to or from the first oil chambers 550c. The oil passage 51c communicates with the second oil chambers 550d, and supplies or discharges the hydraulic oil to or from the second oil chambers 550d.

Figure 4:
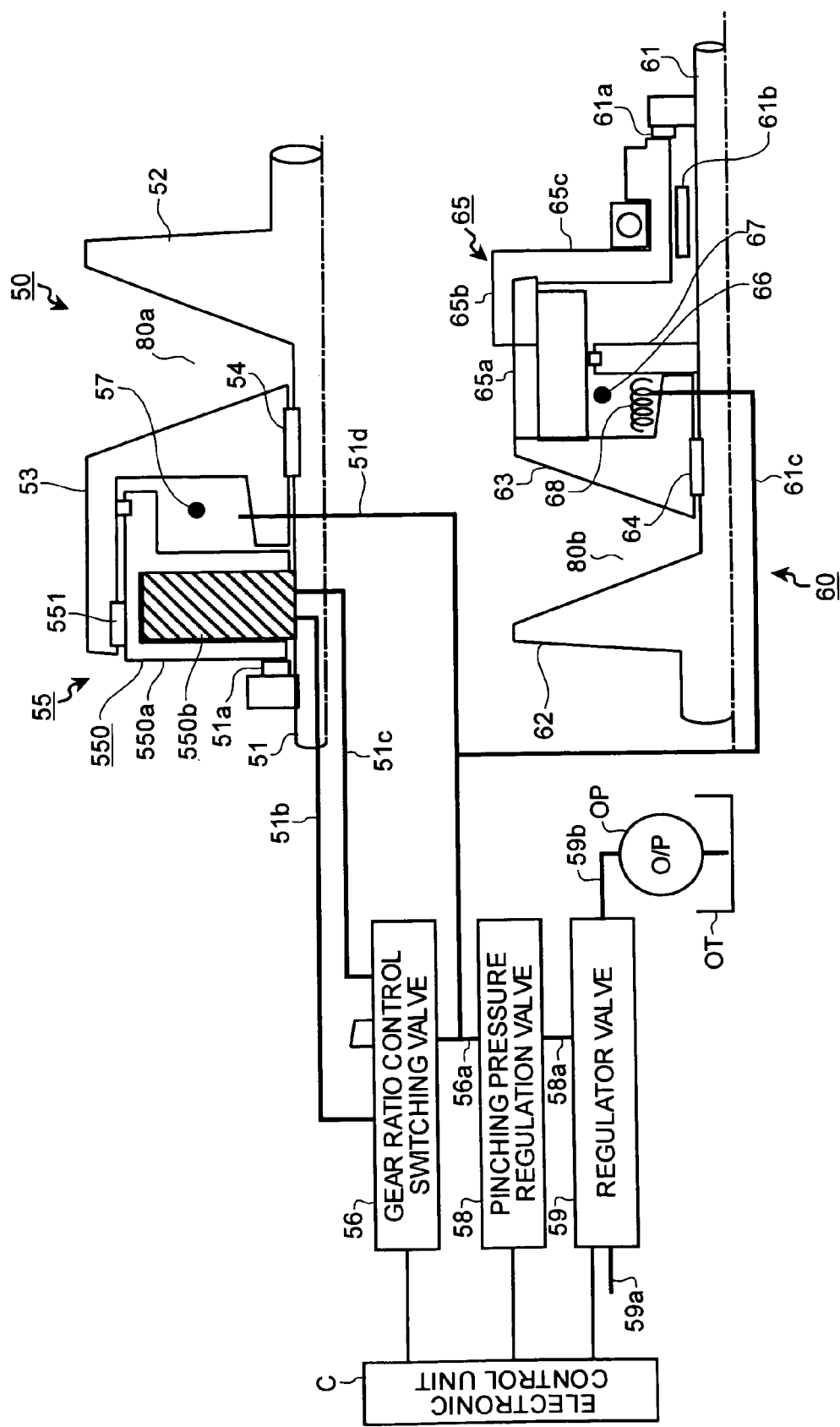
FIG. 4 is a hydraulic circuit for the belt-type CVT shown in FIG. 2.

As shown in FIG. 4, the oil passages 51b and 51c communicate with a gear ratio control switching valve 56. The hydraulic oil is supplied to the gear ratio control switching valve 56 through an oil tank OT, an oil pump (O/P) OP, an oil passage 59b, a regulator valve 59, an oil passage 58a, a pinching pressure regulation valve 58, and an oil passage 56a shown in FIG. 4.

The gear ratio control switching valve 56 switches over the hydraulic oil supply target oil chambers (first oil chambers 550c or second oil chambers 550d) by changing a position of the valve in which a plurality of oil passages are formed. This switchover is performed by adjusting a difference between a reactive force of a spring arranged in a cylinder and a fluid pressure such as the pressure of the air or hydraulic oil supplied into the cylinder. The fluid pressure is controlled by an electronic control unit (ECU) C to be explained later.

Figure 5A:
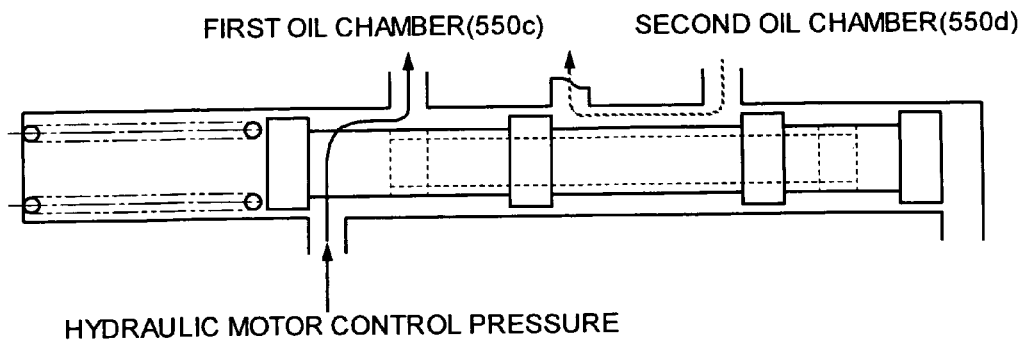
FIGS. 5A to 5C are schematics for explaining an operation performed by a gear ratio control switching valve shown in FIG. 4.

The gear ratio control switching valve 56 supplies the hydraulic oil to the first oil chambers 550c by changing the position of the valve as shown in, for example, FIG. 5A, whereby the hydraulic motor 550 rotates in a forward direction. The gear ratio control switching valve 56 supplies the hydraulic oil to the second oil chambers 550d by changing the position of the valve as shown in, for example, FIG. 5C, whereby the hydraulic motor 550 rotates in a backward direction.

Figure 5B:
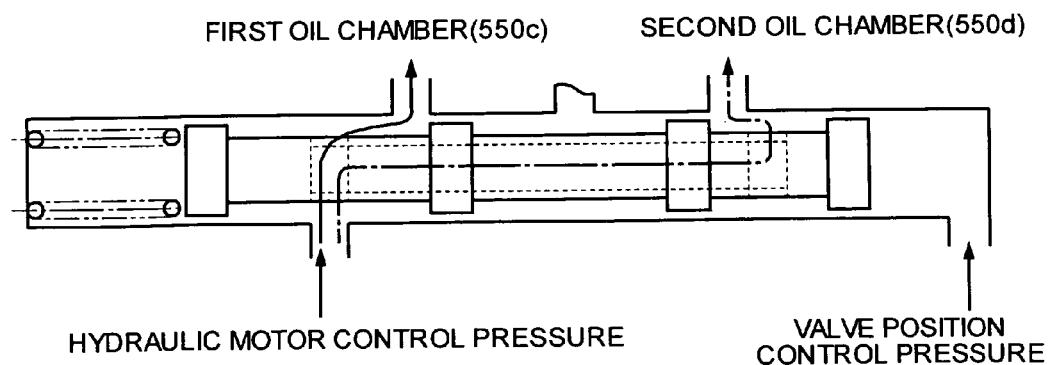

The gear ratio control switching valve 56 supplies the equal-pressure hydraulic oil to the first and the second oil chambers 550c and 550d by changing the position of the valve as shown in, for example, FIG. 5B, thereby stopping the rotation of the hydraulic motor 550. This gear ratio control switching valve 56 is, therefore, also used when the gear ratio γ is fixed.

According to the first embodiment, the hydraulic motor 550 and the movable sheave 53 are arranged integrally on the primary shaft 51. The hydraulic motor 550 and the movable sheave 53 can be, therefore, disposed compact. In addition, the movable sheave sliding mechanism 55 that slides the movable sheave 53 can be miniaturized. By thus miniaturizing the movable sheave sliding mechanism 55, the belt-type CVT 1 itself can be miniaturized. Further, by using the hydraulic motor 550 such as the vane motor and providing the motion direction conversion mechanism 551, it is unnecessary to employ gears for transmitting the driving force of the motor to the movable sheave 53. Thus, the movable sheave sliding mechanism 55 and the belt-type CVT 1 can be made further compact.

The movable sheave 53 is slid using the motion direction conversion mechanism 551. A driving loss that is conventionally derived from the gears can be eliminated, and the driving loss of the movable sheave sliding mechanism 55 can be reduced.

The primary shaft 51 is further provided with a pressure mechanism that presses the movable sheave 53 toward the fixed sheave 52 and that generates the belt pinching pressure in the axial direction of the primary shaft 51 between the fixed sheave 52 and the movable sheave 53.

As shown in FIG. 4, this pressure mechanism includes a hydraulic chamber 57 formed between the hydraulic motor 550 (outer rotor 550a) and the movable sheave 53, an oil passage 51d shown in FIG. 4 that communicates with the hydraulic chamber 57 and that is formed in, for example, the primary shaft 51, and a pinching pressure regulation valve 58 that communicates with the oil passage 51d.

As can be seen, according to the first embodiment, the hydraulic motor 550 (outer rotor 550a) constitutes a part of the hydraulic chamber 57. This reduces the size of the pressure mechanism, and eventually contributes to the miniaturization of the belt-type CVT 1.

This pressure mechanism applies the oil pressure from pinching pressure regulation valve 58, a supply pressure of the hydraulic oil of which is regulated by the ECU C, to the hydraulic chamber 57, thereby generating the belt pinching pressure between the fixed sheave 52 and the movable sheave 53, and preventing slippage of a belt 80 explained later. Further, the hydraulic chamber 57 is provided in series to the hydraulic motor 550 (outer rotor 550a) relative to the axial direction of the primary shaft 51. Using the oil pressure in this hydraulic chamber 57, the movable sheave 53 can be pressed toward the fixed sheave 52. An output of the hydraulic motor 550 can be, therefore, reduced, which contributes to the miniaturization of the hydraulic motor 550 and eventually to the miniaturization of the belt-type CVT 1.

The pinching pressure regulation valve 58 communicates with the gear ratio control switching valve 56 through the oil passage 56a shown in FIG. 4. The oil pressure from this pinching pressure regulation valve 58 is also applied to the first oil chambers 550c and the second oil chambers 550d within the hydraulic motor 550 through the gear ratio control switching valve 56.

The hydraulic chamber 57 and the first and the second oil chambers 550c and 550d within the hydraulic motor 550 are arranged to face each other in the axial direction of the primary shaft 51. In addition, the hydraulic chamber 57 and the first and the second oil chambers 550c and 550d are equal in oil pressure. As a result, an internal pressure between the hydraulic chamber 57 and the first and the second oil chambers 550c and 550d is canceled. Therefore, it is possible to make thin a wall surface of the hydraulic motor 550 (outer rotor 550a) located between the hydraulic chamber 57 and the first and the second oil chambers 550c and 550d, and to make the hydraulic motor 550 lighter in weight.

The hydraulic chamber 57 and the first and the second oil chambers 550c and 550d within the hydraulic motor 550 communicate with one another through the oil passages 51d and 56a, the gear ratio control switching valve 56, and the oil passages 51b and 51c. This can facilitate supplying the hydraulic oil between the hydraulic chamber 57 and the first and the second oil chambers 550c and 550d. This is effective particularly during quick downshifting. As explained later, since the hydraulic oil discharged from the hydraulic chamber 57 can be supplied to the second oil chambers 550d, a response to a change in the gear ratio γ can be improved. Since the supply of the hydraulic oil between the hydraulic chamber 57 and the first and the second oil chambers 550c and 550d can be realized, a consumption amount of the hydraulic oil to be supplied from the oil pump OP can be reduced, which can reduce a capacity of the oil pump OP.

The primary pulley 50—side primary shaft 51 is provided with an actuator that presses the movable sheave 53 toward the fixed sheave 52 by the oil pressure and that generates the belt pinching pressure, that is, a first actuator that includes the hydraulic chamber 57, the pinching pressure regulation valve 58, and the like. In this embodiment, an actuator that employs the oil pressure is taken as an example; however, the actuator is by no means limited to the actuator of this type.

The secondary shaft 61 is provided with a secondary pulley 60 shown in FIG. 1. This secondary pulley 60 includes a fixed sheave 62 formed integrally with an outer periphery of the secondary shaft 61, and a movable sheave 63 slidable in an axial direction of the secondary shaft 61. The movable sheave 63 is spline-fitted into the secondary shaft 61 by a spline 64 shown in FIG. 6. A V groove 80b is formed between opposing surfaces of the fixed sheave 62 and the movable sheave 63.

The secondary shaft 61 is further provided with a pressure mechanism that presses the movable sheave 63 toward the fixed sheave 62 and that generates a belt pinching pressure in the axial direction of the secondary shaft 61 between the fixed sheave 62 and the movable sheave 63. As the pressure mechanism according to the first embodiment, two types, i.e., a torque cam 65 mainly responsible for generation of the belt pinching pressure and a hydraulic chamber 66 that makes up for a deficiency of the belt pinching pressure generated by the torque cam 65 are provided.

Figure 6:
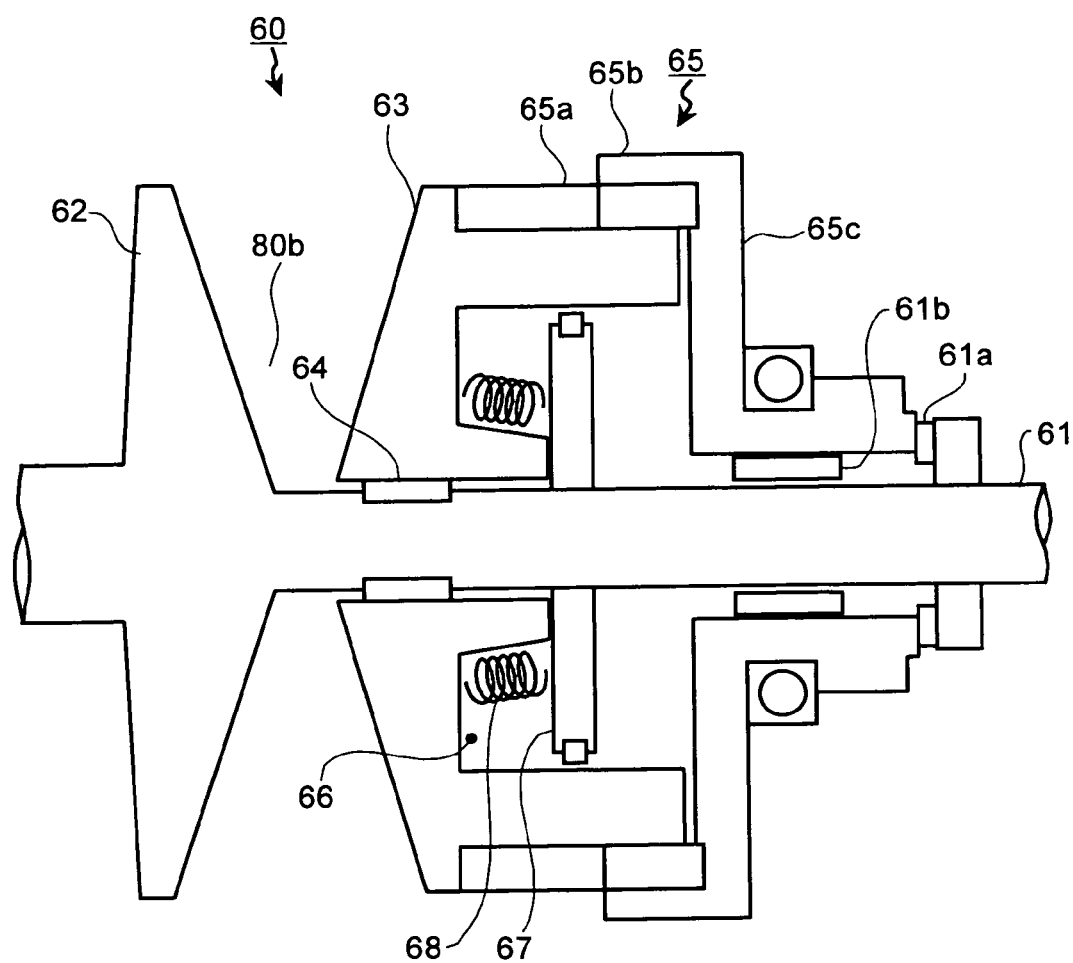
FIG. 6 is an exemplary configuration of a secondary pulley of the belt-type CVT shown in FIG. 2.
Figure 7A:
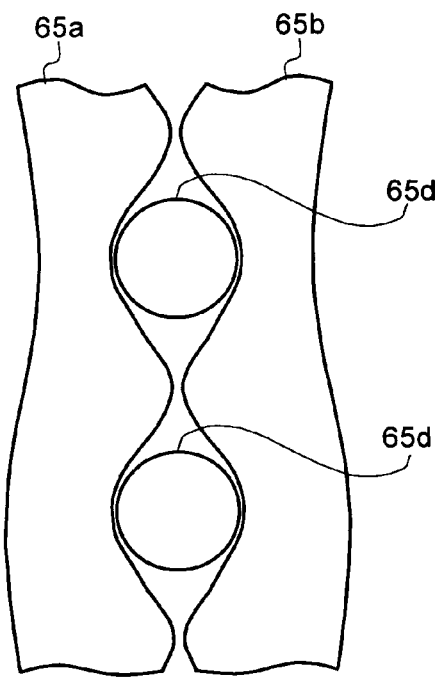
FIGS. 7A and 7B are explanatory views of a torque cam shown in FIG. 6.
Figure 7B:
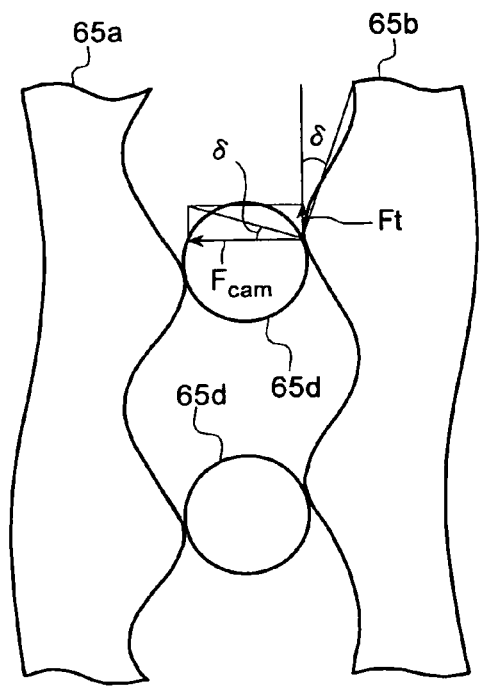

As shown in, for example, FIGS. 6, 7A, and 7B, the torque cam 65 of the first embodiment includes, for example, a first engagement portion 65a that is provided annually in the movable sheave 63 and that has irregularities, a torque cam main body 65c including a second engagement portion 65b having irregularities and facing the first engagement portion 65a, and a plurality of spherical members 65d arranged between the first and the second engagement portions 65a and 65b.

The torque cam main body 65c can rotate on its axis of rotation relatively to the secondary shaft 61 and the movable sheave 63 by a bearing 61a fixed to the secondary shaft 61 and a bearing 61b arranged between the torque cam main body 65c and the secondary shaft 61 as shown in FIG. 6.

By so constituting the torque cam 65, even if the movable sheave 63 is closer to the fixed sheave 62 (that is, the first engagement portion 65a is farther from the second engagement portion 65b), for example, the torque cam main body 65c rotates relatively to the movable sheave 63 that rotates together with the secondary shaft 61. The torque cam 65 can be, therefore, changed from a state shown in FIG. 7A to a state shown in FIG. 7B, and can generate face pressures among the first engagement portion 65a, the second engagement portion 65b, and the spherical members 65d. This enables the second engagement portion 65b and the spherical members 65d to press the first engagement portion 65a, thereby generating the belt pinching pressure between the fixed sheave 62 and the movable sheave 63. Thus, it is possible to prevent slippage of the belt 80.

Since the torque cam main body 65c and the movable sheave 63 rotate relatively to each other, the movable sheave 63 and the fixed sheave 62 are not distorted relatively to each other even if the torque cam main body 65c generates a thrust toward the movable sheave 63. Thus, it is possible to improve a durability of the belt 80 and increase a width of the gear ratio γ. This can maintain relative positions of the primary pulley 50 and the secondary pulley 60 to be initial set positions, thereby contributing to an improvement in the durability of the belt 80.

The secondary shaft 61 can receive a reactive force to the thrust generated by the torque cam 65 resulting from the face pressures through the bearing 61a. In this way, similarly to the instance of the primary pulley 50, the stationary elements do not receive the reactive force and a rotational motion of the bearing 61a hardly occurs, thereby reducing a loss due to the bearing 61a.

The operating portions of the torque cam 65 (the first and the second engagement portions 65a and 65b and the spherical members 65d) are arranged on an outer diameter of the movable sheave 63. The face pressures among the first engagement portion 65a, the second engagement portion 65b, and the spherical members 65d can be, therefore, reduced.

The hydraulic chamber 66 according to the first embodiment includes a space portion of the movable sheave 63 opposite to the groove 80b, and a circular member 67 provided on the secondary shaft 61 and concentric with the secondary shaft 61.

The hydraulic chamber 66 is located on an inner diameter of the movable sheave 63, so that a capacity of the chamber 66 can be reduced. This can reduce a flow rate of the hydraulic chamber 66 during quick downshifting or the like.

The hydraulic chamber 66 communicates with, for example, an oil passage 61c formed in the secondary shaft 61 as shown in FIG. 4, and also communicates with the pinching pressure regulation valve 58 through the oil passage 51d communicating with the oil passage 61c.

The pressure mechanism of the secondary pulley 60 that includes the hydraulic chamber 66, the oil passage 61c, and the pinching pressure regulation valve 58 applies the oil pressure from the pinching pressure regulation valve 58, a supply pressure of the hydraulic oil of which is controlled by the ECU C, to the hydraulic chamber 66. The pressure mechanism generates the belt pinching pressure between the fixed sheave 62 and the movable sheave 63, and prevents slippage of the belt 80.

Even if the torque cam 65 cannot generate the thrust due to a torque disturbance during the change in the gear ratio γ (e.g., when the movable sheave 63 of the secondary pulley 60 is driven or not driven), the pressure mechanism composed by the hydraulic chamber 66 or the like that operates by the oil pressure, independently of this torque cam 65 and the like can generate a desired belt pinching pressure. Slippage of the belt 80 can be prevented, thereby improving reliability and drivability.

As explained, according to the first embodiment, the secondary pulley 60—side secondary shaft 61 is provided with an actuator that presses the movable sheave 63 toward the fixed sheave 62 by the oil pressure and that generates the belt pinching pressure, that is, a second actuator that includes the hydraulic chamber 66, the pinching pressure regulation valve 58, and the like, similarly to the primary pulley 50. In the first embodiment, the actuator using the oil pressure is taken as an example; however, the actuator according to the present invention is not always limited to the actuator of this type.

The hydraulic chamber 66 is provided with an elastic member 68, such as a coil spring, having one end fixed to a wall surface of the space portion of the movable sheave 63, and the other end fixed to the circular member 67.

According to the first embodiment, the torque cam 65 is set to have a cam angle (e.g., an angle of a nonlinear cam) δ so that the thrust generated by the torque cam 65 is lower than a necessary thrust. In addition, both of or one of the pressure mechanism and the elastic member 68 makes up for the deficiency of the thrust.

Moreover, it is not necessary to pinch the belt 80 with an excessive force, thereby improving the durability of the belt 80. Further, a driving loss of the belt 80 can be reduced, so that power transmission efficiency can be improved and a power of the oil pump can be reduced.

Generally, the thrust generated by the torque cam 65 has small fluctuations while the thrust generated by the hydraulic chamber 66 has large fluctuations due to an influence of the constituent elements of the chamber 66 such as a hydraulic control circuit. According to the first embodiment, the torque cam 65 is mainly responsible for generation of the belt pinching pressure, whereby the belt pinching pressure having small fluctuations can be generated.

Alternatively, it is possible to have a configuration in which both of or one of the pressure mechanism, which includes the hydraulic chamber 66 and the like, and the elastic member 68 can generate a thrust corresponding to the torque generated when the internal combustion engine 10 is not driven. With such a configuration, a possible movement of the movable sheave 63 (that is, a shift transmission) caused by activation of the torque cam 65 can be suppressed and the gear ratio γ can be kept constant. In addition, the belt pinching pressure can be kept at a necessary value.

The number of the pressure mechanisms on the secondary pulley 60 is not limited to two but can be one or three or more. However, provision of two or more pressure mechanisms improves the controllability over the belt pinching pressure generated between the fixed sheave 62 and the movable sheave 63. That is, it is preferable that the belt pinching pressure is shared between the respective pressure mechanisms, and that the pressure mechanism (the hydraulic chamber 66 in this embodiment) operating by the oil pressure is employed as at least one of the pressure mechanisms, thereby improving the controllability over the belt pinching pressure.

A counter drive pinion 92 is fixed to the internal combustion engine 10—side secondary shaft 61. Bearings 87 and 88 for the secondary shaft 61 are provided on both sides of the counter drive pinion 92, respectively.

A power path 90 that includes an intermediate shaft 91 parallel to the secondary shaft 61 is provided between the counter drive pinion 92 and the final reduction gear 70 to be explained later. The intermediate shaft 91 is rotatably supported by bearings 85 and 86, and includes on its axis a counter driven gear 93 and a final drive pinion 94 engaged with the counter drive pinion 92.

A parking gear 65 is arranged between the secondary pulley 60 and the transaxle rear cover 23 on the secondary shaft 61.

In this belt-type CVT 1, the belt 80 is wound on the V grooves 80a and 80b of the primary pulley 50 and the secondary pulley 60, respectively. The belt 80 is an endless belt composed by many metal frames and a plurality of steel rings. Through this belt 80, the torque of the internal combustion engine 10 transmitted to the primary pulley 50 is transmitted to the secondary pulley 60.

The final reduction gear 70 will next be explained. The final reduction gear 70 includes a differential case 71 having a hollow portion inside, a pinion shaft 72, pinions 73 and 74, and side gears 75 and 76.

The differential case 71 is rotatably supported by bearings 77 and 78, and a ring gear 79 engaged with the final drive pinion 94 is provided on an outer periphery of the differential case 71.

The pinion shaft 72 is attached to the hollow portion of the differential case 71, and the pinions 73 and 74 are fixed to the pinion shaft 72.

The side gears 75 and 76 are fixed to a drive shaft 101 (a front drive shaft in this embodiment) 101 equipped with a wheel 100.

In an interior of the transaxle case 22 constituted as explained above, a lubricating oil stored in a bottom (an oil pan) of the case 22 is scraped up by the rotating ring gear 79, and helps smooth respective constituent elements (e.g., the shafts 101, 91, and 61 and the bearings 83 to 88) of the final reduction gear 70 and the like while being transmitted and scattered on engagement surfaces of the respective gears 94, 93, and 92. In addition, the lubricating oil is transmitted onto an inner wall surface of the transaxle case 22 and dropped, thereby helping smooth the primary shaft 51 and the others.

The respective constituent elements including the belt-type CVT 1 are controlled by the ECU C serving as a controller shown in FIG. 4 based on information on various sensors. Data for variably controlling the belt-type CVT 1 is stored in the ECU C in advance. Examples of the data include data for controlling the gear ratio γ of the belt-type CVT 1 according to the traveling state based on information such as a throttle opening and a vehicle speed, and an engine torque characteristic map to be explained later. Operations of the movable sheave sliding mechanism 55 and the pressure mechanisms (the torque cam 65 and the hydraulic chamber 66) when controlling the gear ratio γ will next be explained in detail.

Acceleration by reducing the gear ratio γ will first be explained. The ECU C controls the regulator valve 59, the pinching pressure regulation valve 58, and the gear ratio control switching valve 56 to cause the hydraulic oil to flow into the first chambers 550c. In addition, the ECU C controls the movable sheave 53 to be closer to the fixed sheave 52 so that a winding radius of the belt 80 on the primary pulley 50 corresponds to a desired gear ratio γ.

In this case, this ECU C controls the fluid pressure for activating the gear ratio control switching valve 56, thereby adjusting the valve position as shown in FIG. 5A. By so adjusting, the hydraulic oil is supplied to the first oil chambers 550c and the hydraulic oil is discharged from the second oil chambers 550d. As a result, the outer rotor 550a of the hydraulic motor 550 rotates relatively to the primary shaft 51.

Following the rotation of the hydraulic motor 550, the movable sheave 53 of the primary pulley 50 comes closer to the fixed sheave 52 through the motion direction conversion mechanism 551. In addition, the movable sheave 63 of the secondary pulley 60 moves farther from the fixed sheave 62. Thus the gear ratio γ is reduced.

At this moment, the movable sheave 63 of the secondary pulley 60 rotates together with the fixed sheave 62, the secondary shaft 61, and the bearing 61a. Accordingly, the movable sheave 63 and the torque cam main body 65 rotate relatively to each other, whereby the torque cam 65 is changed from, for example, a separation state shown in FIG. 7B to an approach state shown in FIG. 7A. This can generate the belt pinching pressure between the fixed sheave 52 and the movable sheave 53, thereby preventing slippage of the belt 80.

During sliding of the movable sheaves 53 and 63, the hydraulic oil is supplied to the hydraulic chamber 57 of the primary pulley 50 through the oil passage 51d and the hydraulic oil is discharged from the hydraulic chamber 66 of the secondary pulley 60 through the oil passage 61c. In the primary pulley 50, the movable sheave 53 is pressed in the sliding direction by supply of the hydraulic oil to the hydraulic chamber 57. A pressure force for pressing the movable sheave 53 makes up for a sliding force for sliding the movable sheave 53 by the hydraulic motor 550. Therefore, even if the output of the hydraulic motor 550 is low, the movable sheave 53 can be slid sufficiently. It is, therefore, possible to employ a small-sized hydraulic motor 550 having a reduced output.

As shown in FIG. 4, the oil passages 51d and 61c communicate with each other. The hydraulic oil discharged from the hydraulic chamber 66 of the secondary pulley 60 is, therefore, supplied to the hydraulic chamber 57 of the primary pulley 50. The hydraulic oil discharged from the hydraulic chamber 66 is also supplied to the first oil chambers 550c through the gear ratio control switching valve 56. Thus, the hydraulic oil discharged from certain chambers can be cyclically supplied to the other chambers, whereby the consumption amount of the hydraulic oil can be reduced and the capacity of the oil pump OP can be reduced.

After finishing changing the gear ratio γ, the ECU C adjusts the position of the gear ratio control switching valve 56 as shown in FIG. 5B to apply the same oil pressure to the first oil chambers 550c and the second oil chambers 550d from the pinching pressure regulation valve 58. As a result, the relative rotation of the hydraulic motor 550 to the primary shaft 51 is stopped, and the hydraulic motor 550 rotates integrally with the primary shaft 51 and the movable sheave 53. This can eliminate a rotation difference between the hydraulic motor 550 and the primary shaft 51 or the movable sheave 53, thereby reducing a loss caused by unnecessary relative rotation, friction, and the like among them.

The oil pressure from the pinching pressure regulation valve 58 is also applied to the hydraulic chamber 57 of the primary pulley 50 and the hydraulic chamber 66 of the secondary pulley 60. As a result, the belt pinching pressure is generated between the fixed sheave 52 and the movable sheave 53 on the primary pulley 50 and the belt pinching pressure is generated between the fixed sheave 62 and the movable sheave 63 on the secondary pulley 60. Therefore, the slippage of the belt 80 can be prevented.

Deceleration by increasing the gear ratio γ will next be explained. The ECU C controls the regulator valve 59, the pinching pressure regulation valve 58, and the gear ratio control switching valve 56 to cause the hydraulic oil to flow into the second oil chambers 550d. In addition, the ECU C controls the movable sheave 53 to be farther from the fixed sheave 52 so that the winding radius of the belt 80 on the primary pulley 50 corresponds to the desired gear ratio γ.

Figure 5C:
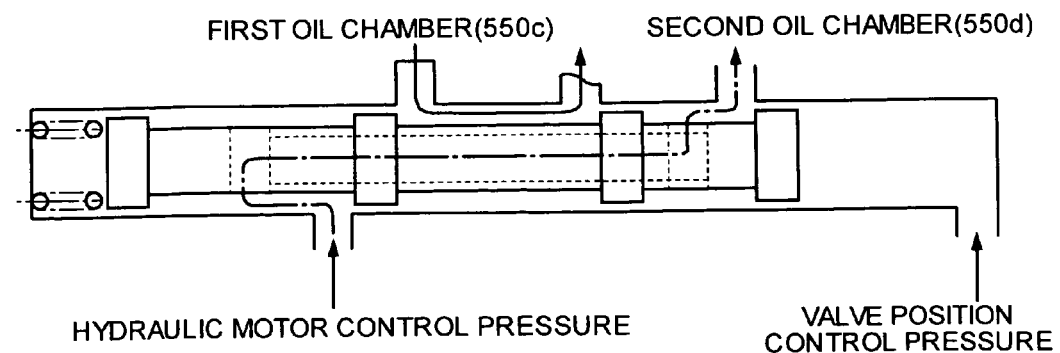

In this case, the ECU C controls the fluid pressure for activating the gear ratio control switching valve 56, thereby adjusting the valve position as shown in FIG. 5C. By so adjusting, the hydraulic oil is supplied to the second oil chambers 550d and the hydraulic oil is discharged from the first oil chambers 550c. As a result, the outer rotor 550a of the hydraulic motor 550 rotates relatively to the primary shaft 51.

Following the rotation of the hydraulic motor 550, the movable sheave 53 of the primary pulley 50 is moved farther from the fixed sheave 52 through the motion direction conversion mechanism 551. In addition, the movable sheave 63 of the secondary pulley 60 comes closer to the fixed sheave 62. Thus, the gear ratio γ is increased.

At this moment, the movable sheave 63 of the secondary pulley 60 rotates together with the fixed sheave 62, the secondary shaft 61, and the bearing 61a. The movable sheave 63 and the torque cam main body 65, therefore, rotate relatively to each other, whereby the torque cam 65 is changed from, for example, the approach state shown in FIG. 7A to the separation state shown in FIG. 7B. This can generate the belt pinching pressure between the fixed sheave 52 and the movable sheave 53, and can prevent slippage of the belt 80.

The hydraulic oil is discharged from the hydraulic chamber 57 of the primary pulley 50 through the oil passage 51d and supplied to the hydraulic chamber 66 of the secondary pulley 60 through the oil passage 61c. In this case, the hydraulic oil discharged from the hydraulic chamber 57 of the primary pulley 50 is supplied to the hydraulic chamber 66 of the secondary pulley 60 and the second oil chambers 550d of the primary pulley 50. This makes it possible to not only reduce the capacity of the oil pump OP but also supply the hydraulic oil to the second oil chambers 550d from the hydraulic chamber 57 particularly during quick downshifting, thereby quickly rotating the hydraulic motor 550. The response to the change in the gear ratio γ can be, therefore, advantageously improved.

Operations after changing the gear ratio γ are equal to those when making the gear ratio γ higher.

Operations for generating the belt pinching pressures on the primary pulley 50 and the secondary pulley 60 after changing the gear ratio γ will next be explained.

The pinching pressure regulation valve 58 according to the first embodiment is constituted to supply the hydraulic oil at the equal oil pressure to the hydraulic chamber 57 of the primary pulley 50 and the hydraulic chamber 66 of the secondary pulley 60. In the first embodiment, therefore, the oil pressure of the hydraulic oil supplied to one of the hydraulic chambers 57 and 66 is calculated, the hydraulic oil at the calculated oil pressure is supplied to both of the hydraulic chambers 57 and 66, and the belt pinching pressures are thereby generated.

Calculation of a primary oil pressure $P_{pri}$ to be applied to the hydraulic chamber 57 of the primary pulley 50, control of the hydraulic chamber 57 of the primary pulley 50 and the hydraulic chamber 66 of the secondary pulley 60 based on this primary oil pressure $P_{pri}$, and generation of the belt pinching pressures on both the primary pulley 50 and the secondary pulley 60 is explained with reference to a flowchart shown in FIG. 8.

Figure 9:
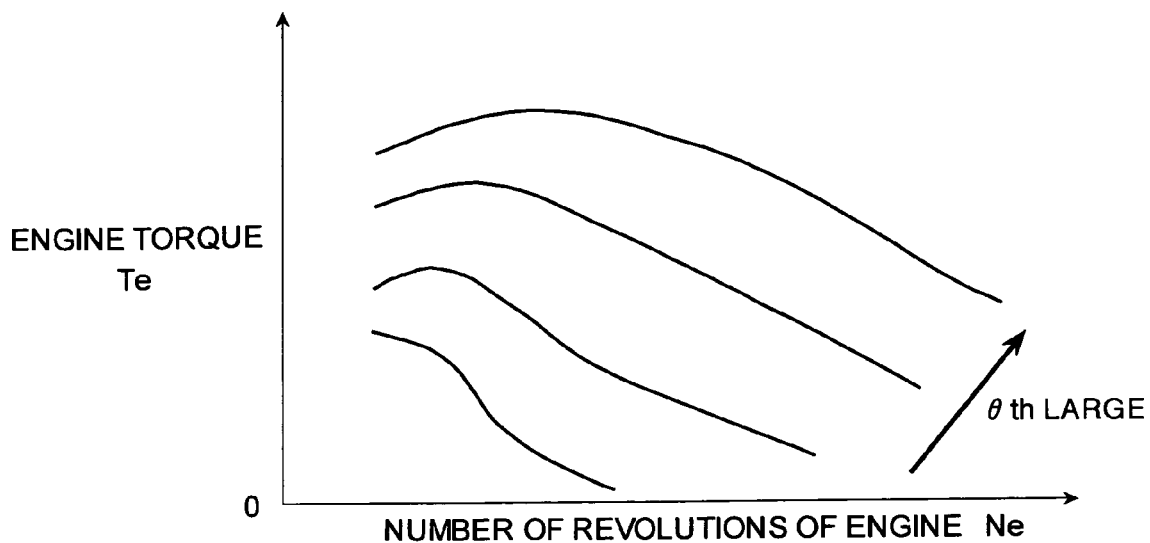
FIG. 9 is an example of an engine torque characteristic map.

The ECU C calculates an output torque Te (Ne, $\theta_{th}$) of the internal combustion engine 10 from an engine torque characteristic map shown in FIG. 9 based on the number of revolutions of the engine Ne and a throttle opening $\theta_{th}$. The calculated output torque Te (Ne, $\theta_{th}$) is estimated as an input torque $T_{in}$ input to the belt-type CVT 1 (at step ST1), and a torque of the primary pulley 50 in the rotational direction (hereinafter, "primary torque") $T_{pri}$ is calculated from the following Equation (1).

$$T_{pri} = T_{in} \tag{1}$$

The ECU C then calculates a total thrust of the primary pulley 50 in the axial direction necessary to keep the changed gear ratio γ (hereinafter, "primary necessary total thrust") $Fn_{pri-all}$ (at step ST3).

This primary necessary total thrust $Fn_{pri-all}$ is calculated by assigning the primary torque $T_{pri}$ calculated at the step ST2 to the following Equation (2).

$$Fn_{pri-all} = T_{pri} \times \frac{\cos\theta}{2\mu r_{pri}} \quad (2)$$

Figure 10:
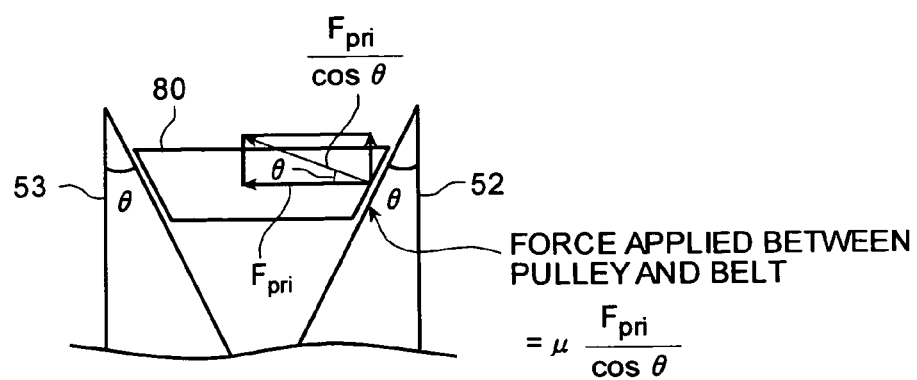
FIG. 10 is an explanatory view of a force applied between a primary pulley and a belt.

In Equation (2), θ denotes a pulley angle of each of the fixed sheave 52 and the movable sheave 53 of the primary pulley 50, μ denotes a coefficient of friction between the fixed sheave 52 or the movable sheave 53 and the belt 80, and $r_{pri}$ denotes the winding radius of the belt 80 on the primary pulley 50 as shown in FIG. 10.

The Equation (2) is obtained from a relational equation (the following Equation (3)) of a relation between a frictional force in the rotational direction between the fixed sheave 52 or the movable sheave 53 and the belt 80, and the primary torque $T_{pri}$ shown in FIG. 10. The primary thrust $F_{pri}$ shown in the Equation (3) is replaced by the primary necessary total thrust $Fn_{pri-all}$.

$$T_{pri} = 2 \times \frac{\mu F_{pri}}{\cos\theta} \times r_{pri} \quad (3)$$

In the primary pulley 50 according to the first embodiment, the primary necessary total thrust $Fn_{pri-all}$ corresponds to a thrust generated by the oil pressure of the hydraulic chamber 57 (hereinafter, "primary necessary hydraulic thrust") $Fn_{pri-p}$. Therefore, after obtaining the primary necessary total thrust $Fn_{pri-all}$, the ECU C calculates an oil pressure to be indicated to the pinching pressure regulation valve 58 (hereinafter, "control indication primary oil pressure") $P_{pri}$ (at step ST4).

This control indication primary oil pressure $P_{pri}$ is preferably calculated by the following Equation (4). In actual practice, however, the control indication primary oil pressure $P_{pri}$ is influenced by an oil pressure allowance resulting from a centrifugal oil pressure in the axial direction due to the hydraulic oil in the hydraulic chamber 57 and the like. The control indication primary oil pressure $P_{pri}$ is, therefore, calculated by the following Equation (5) in light of the oil pressure allowance (assumed herein as ±a %).

$$P_{pri} = \frac{Fn_{pri-all}}{A_{pri}} \quad (4)$$

$$P_{pri} = \frac{Fn_{pri-all}}{A_{pri}} \left(1 \pm \frac{a}{100}\right) \quad (5)$$

In the Equations (4) and (5), $A_{pri}$ denotes a pressure receiving area in the hydraulic chamber 57 to which the oil pressure in the axial direction is applied.

After calculating the control indication primary oil pressure $P_{pri}$ using the Equation (5), the ECU C controls the pinching pressure regulation valve 58 to generate the control indication primary oil pressure $P_{pri}$ (at step ST4).

The control indication primary oil pressure $P_{pri}$ is applied to both he hydraulic chambers 57 and 66, thereby generating the belt pinching pressures on the primary pulley 50 and the secondary pulley 60 by the hydraulic chambers 57 and 66, respectively. At this moment, on the secondary pulley 60, the belt pinching pressure is also generated by the torque cam 65.

Calculation of a secondary oil pressure $P_{sec}$ to be applied to the hydraulic chamber 66 of the secondary pulley 60, and control of the hydraulic chamber 57 of the primary pulley 50 and the hydraulic chamber 66 of the secondary pulley 60 based on this secondary oil pressure $P_{sec}$, thereby generating the belt pinching pressure respectively, will next be explained, with reference to a flowchart shown in FIG. 11.

The ECU C estimates an input torque $T_{in}$ input to the belt-type CVT 1 similarly to the instance of the primary pulley 50 (at step ST11), and calculates a torque of the secondary pulley 60 in the rotational direction (hereinafter, "secondary torque") $T_{sec}$ from the following Equation (6) (at step ST12). The secondary torque $T_{sec}$ is equal to a transmission torque of the torque cam 65 in the rotational direction (hereinafter, "torque cam transmission torque") $T_{cam}$, and corresponds to the output torque of the belt-type CVT 1.

$$T_{sec} = T_{in} \times \gamma \quad (6)$$

The ECU C calculates a total thrust of the secondary pulley 60 in the axial direction necessary to keep the changed gear ratio γ (hereinafter, "secondary necessary total thrust") $Fn_{sec-all}$ (at step ST13). In addition, the ECU C calculates a thrust of the torque cam 65 in the axial direction (hereinafter, "torque cam thrust") $F_{cam}$ (at step ST14).

The secondary necessary total thrust $Fn_{sec-all}$ is calculated by assigning the secondary torque $T_{sec}$ calculated at the step ST12 to the following Equation (7).

$$Fn_{sec-all} = T_{sec} \times \frac{\cos\theta}{2\mu r_{sec}} \quad (7)$$

In Equation (7), θ is the pulley angle of each of the fixed sheave 62 and the movable sheave 63 of the secondary pulley 60, μ denotes the coefficient of friction between the fixed sheave 62 or the movable sheave 63 and the belt 80, $r_{sec}$ denotes the winding radius of the belt 80 on the secondary pulley 60. This Equation (7) is obtained similarly to the Equation (2).

The torque cam thrust $F_{cam}$ is calculated by assigning the secondary torque $T_{sec}$ calculated at the step ST12 to the following Equation (8).

$$F_{cam} = \frac{T_{sec}}{r_{cam} \times \tan\delta} \quad (8)$$

In Equation (8), $r_{cam}$ denotes a cam fitting radius of the torque cam 65 and δ denotes a cam angle of the torque cam 65.

Equation (8) is obtained from relational equations (the following Equations (9) and (10)) for a relation between the torque cam thrust $F_{cam}$ in the axial direction and the connection force $F_t$ of the peripheral torque cam 65 shown in FIG. 7B.

$$F_{cam} = \frac{F_t}{\tan\delta} \quad (9)$$

$$F_t = \frac{T_{sec}}{r_{cam}} \quad (10)$$

The ECU C divides the calculated-secondary necessary total thrust $Fn_{sec\text{-}all}$ by the torque cam thrust $F_{cam}$ as represented by the following Equation (11), thereby calculating a thrust generated by the oil pressure of the hydraulic chamber 66 (hereinafter, "secondary necessary hydraulic thrust") $Fn_{sec\text{-}p}$ (at step ST15).

$$Fn_{sec\text{-}p} = Fn_{sec\text{-}all} - F_{cam} \tag{11}$$

The ECU C calculates an oil pressure to be indicated to the pinching pressure regulation valve 58 (hereinafter, "control indication secondary oil pressure") $P_{sec}$ in light of the oil pressure allowance (assumed as ±a %) from the following Equation (12) similarly to the instance of the primary pulley 50 (at step ST16). The ECU C controls the pinching pressure regulation valve 58 to generate the control indication secondary oil pressure $P_{sec}$ (at step ST17).

$$P_{sec} = \frac{Fn_{sec\text{-}p}}{A_{sec}} \left(1 \pm \frac{a}{100}\right) \tag{12}$$

In Equation (12), $A_{sec}$ denotes a pressure receiving area in the hydraulic chamber 66 to which the oil pressure in the axial direction is applied.

As a consequence, the control indication secondary oil pressure $P_{sec}$ is applied to both the hydraulic chambers 57 and 66, and the belt pinching pressures are generated by the hydraulic chambers 57 and 66 on both the primary pulley 50 and the secondary pulley 60.

As explained, according to the first embodiment, the ECU C includes an actuator control arrangement that controls the oil pressures (control amounts) of both of the hydraulic chambers 57 and 66 constituting the first actuator and the second actuator, respectively, based on the input torque $T_{in}$ input to the belt-type CVT 1. This actuator control arrangement can control at least one of the oil pressures of the hydraulic chambers 57 and 66.

The actuator control arrangement sets the oil pressure applied to the respective hydraulic chambers 57 and 66 according to the input torque $T_{in}$ input to the belt-type CVT 1. This input torque $T_{in}$ is estimated from the output torque $Te(Ne, \theta_{th})$ of the internal combustion engine 10 as explained, and is not necessarily equal to the output torque $Te(Ne, \theta_{th})$ of the internal combustion engine 10. For instance, the torque converter 30 and the like are interposed between the internal combustion engine 10 and the belt-type CVT 1, so that the torque may change while being transmitted between them.

In the first embodiment, therefore, an input torque deriving arrangement that derives the input torque $T_{in}$ actually input to the belt-type CVT 1 is provided in the ECU C. The ECU C thereby controls the belt pinching pressures using the actuator control arrangement based on the input torque $T_{in}$.

As such an input torque deriving arrangement, a map of the input torque $T_{in}$ using the number of revolutions of the engine Ne and the throttle opening $\theta_{th}$ as parameters may be prepared in advance and the input torque $T_{in}$ may be derived based on this map. In the first embodiment, the following calculation processings are performed to derive the actual input torque $T_{in}$. Operations of the input torque deriving arrangement are explained with reference to a flowchart shown in FIG. 12.

The ECU C according to the first embodiment calculates the total thrust of the secondary pulley 60 in the axial direction (hereinafter, "secondary total thrust") $F_{sec\text{-}all}$ based on the primary oil pressure $P_{pri}$ in the hydraulic chamber 57 of the primary pulley 50 from the following Equation (13) (at step ST21).

$$Fn_{sec\text{-}all} = r_{pp}(\gamma) \times (F_{pri\text{-}cp}) \tag{13}$$

Figure 13:
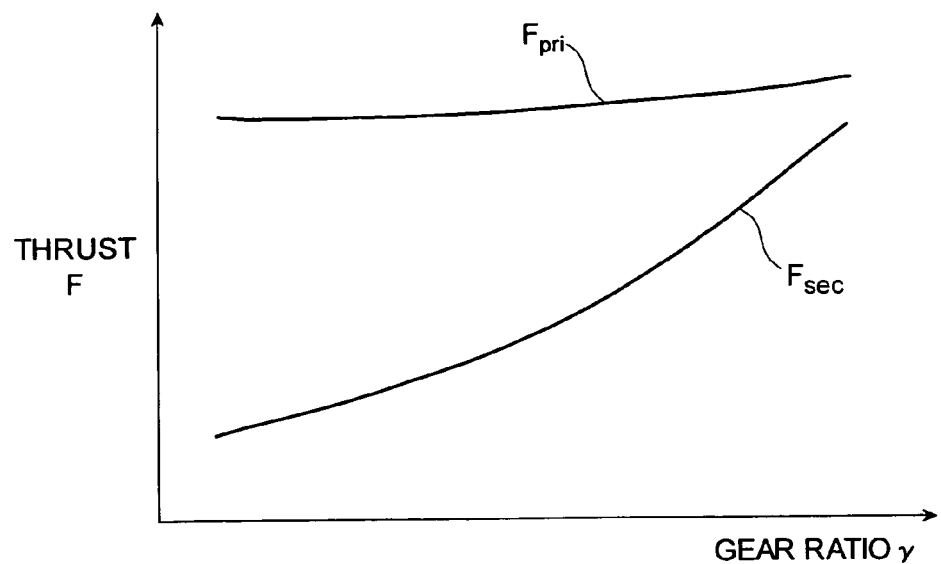
FIG. 13 is a graph of thrust verses gear ratio for a primary thrust and a secondary thrust.

In Equation (13), $r_{pp}(\gamma)$ denotes a ratio (a thrust ratio=$F_{sec}/F_{pri}$) of a thrust of the secondary pulley 60 in the axial direction (hereinafter, "secondary thrust") $F_{sec}$ to a thrust of the primary pulley 50 in the axial direction (hereinafter, "primary thrust") $F_{pri}$ according to the gear ratio γ. This thrust ratio $r_{pp}(\gamma)$ is obtained from a thrust-gear ratio map representing a relationship among the gear ratio γ, the primary thrust $F_{pri}$, and the secondary thrust $F_{sec}$ as shown in FIG. 13.

In the Equation (13), $F_{pri\text{-}p}$ denotes a thrust generated by the primary oil pressure $P_{pri}$ applied to the hydraulic chamber 57 (hereinafter, "primary hydraulic thrust"). The primary hydraulic thrust $F_{pri\text{-}p}$ is obtained by multiplying a present control indication primary oil pressure $P_{pri}$ by the pressure receiving area $A_{pri}$. Further, $F_{pri\text{-}cp}$ denotes a thrust generated by the primary centrifugal oil pressure $P_{pri\text{-}cp}$ in the axial direction caused by the hydraulic oil in the hydraulic chamber 57 (hereinafter, "primary centrifugal hydraulic thrust"). The primary centrifugal hydraulic thrust $F_{pri\text{-}cp}$ is obtained by multiplying the primary centrifugal oil pressure $P_{pri\text{-}cp}$ by the pressure receiving area $A_{pri}$.

The primary oil pressure $P_{pri}$ used in this calculation processings may be the control indication primary oil pressure $P_{pri}$ or the control indication secondary oil pressure $P_{sec}$ which the ECU C indicates to the pinching pressure regulation valve 58. Alternatively, a pressure sensor may be arranged on the hydraulic control circuit such as the hydraulic chamber 57 or the oil passage 51d, and the primary oil pressure $P_{pri}$ may be acquired based on output information of this pressure sensor. In the first embodiment, it is preferable that the pressure sensor is provided in the hydraulic chamber 57 since the primary centrifugal oil pressure $P_{pri\text{-}cp}$ is also used for the calculation operation.

The ECU C calculates the torque cam thrust $F_{cam}$ by dividing the secondary total thrust $F_{sec\text{-}all}$ calculated at the step ST21 by the secondary hydraulic thrust $F_{sec\text{-}p}$ and the secondary centrifugal hydraulic thrust $F_{sec\text{-}cp}$ using the following Equation (14) (at step ST22).

$$F_{cam} = F_{sec\text{-}all} - (F_{sec\text{-}p} + F_{sec\text{-}cp}) \tag{14}$$

The secondary hydraulic thrust $F_{sec\text{-}p}$ is calculated by multiplying the present control indication secondary oil pressure $P_{sec}$ by the pressure receiving area $A_{sec}$, and the secondary centrifugal oil pressure $P_{sec\text{-}cp}$ is calculated by multiplying the secondary centrifugal oil pressure $P_{sec\text{-}cp}$ by the pressure receiving area $A_{sec}$.

The secondary oil pressure $P_{sec}$ can be the control indication primary oil pressure $P_{pri}$ or the control indication secondary oil pressure $P_{sec}$ which the ECU C indicates to the pinching pressure regulation valve 58. Alternatively, a pressure sensor can be provided on the hydraulic control circuit such as the hydraulic chamber 66 or the oil passage 61c, and the secondary oil pressure $P_{sec}$ may be acquired based on output information of this pressure sensor. It is preferable that the pressure sensor be provided in the hydraulic chamber 66.

The ECU C calculates the secondary torque $T_{sec}$ (torque cam transmission torque $T_{cam}$) from the torque cam thrust $F_{cam}$ calculated at the step ST22 and data on the torque cam 65 (at step ST23). To simplify this calculation processing, two parameters of the cam fitting radius $r_{cam}$ and the cam angle δ are used as the data on the torque cam 65. However, the data on the torque cam 65 is not always limited to these parameters.

The secondary torque $T_{sec}$ is calculated from the following Equation (15) that is obtained by modifying the Equation (8). The cam angle δ of the torque cam 65 may be either constant or variable according to the position (or the gear ratio γ) of the movable sheave 63 in the axial direction (e.g., the cam angle of the nonlinear cam). In the latter case, the cam angle δ according to the gear ratio γ is assigned to the Equation (15).

$$F_{sec} = F_{cam} \times r_{cam} \times \tan\theta \tag{15}$$

After thus calculating the secondary torque $T_{sec}$, the ECU C assigns the secondary torque $T_{sec}$ and the present gear ratio γ to the following Equation (16), thereby calculating the input torque $T_{in}$ (at step ST24). In addition, the ECU C creates or corrects an input torque characteristic map (at step ST25).

$$T_{in} = \frac{1}{\gamma} \times T_{sec} \quad (16)$$

The input torque characteristic map is similar to the engine torque characteristic map shown in FIG. 9, and the input torque $T_{in}$ can be obtained from the input torque characteristic map with the number of revolutions of the engine Ne and the throttle opening $\theta_{th}$ used as parameters. At the step ST25, after the input torque characteristic map is created, the input torque calculation processing is repeatedly performed to correct the map.

Figure 11:
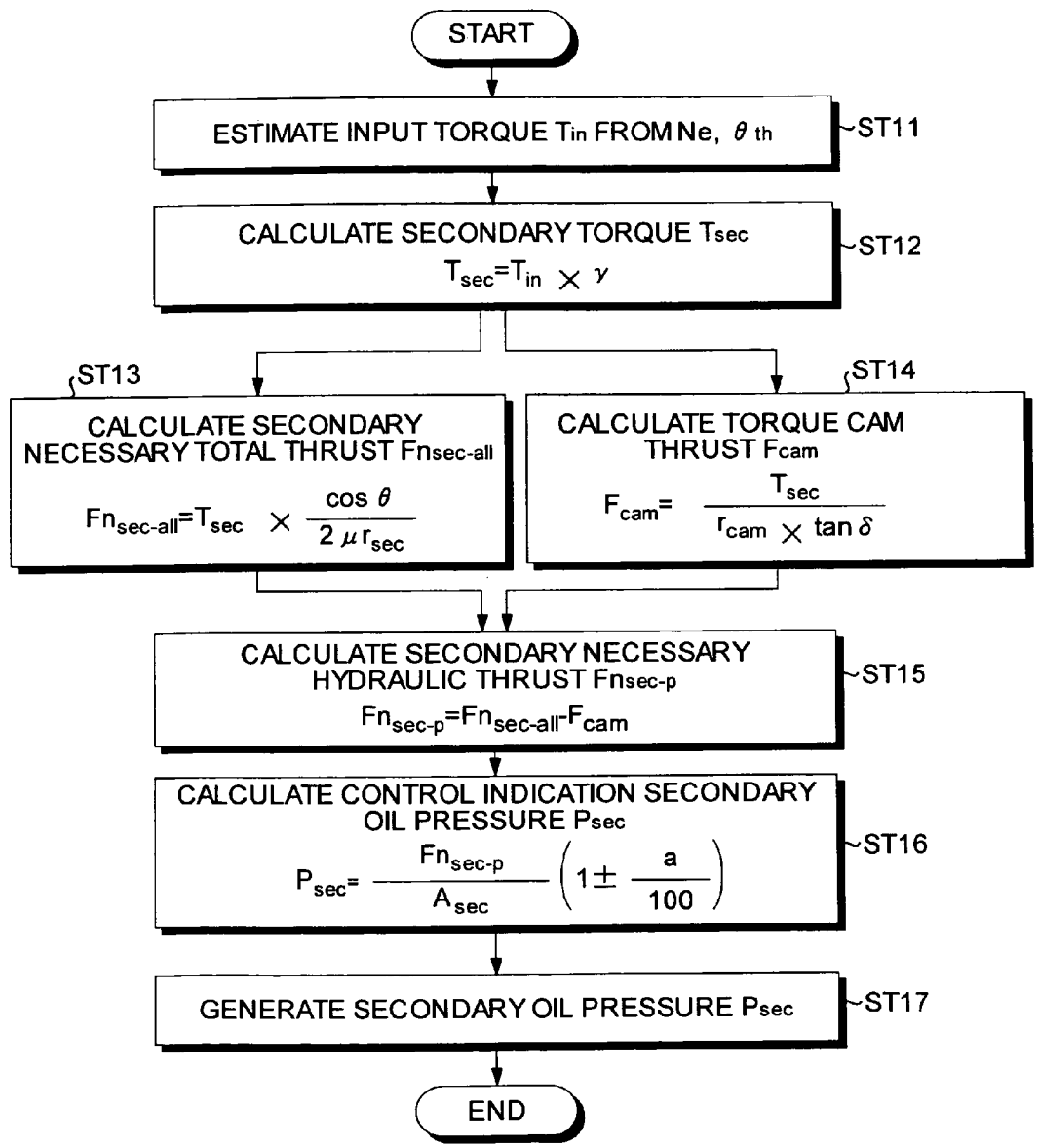
FIG. 11 is a flowchart for explaining a secondary oil pressure generation operation according to the first embodiment.
Figure 12:
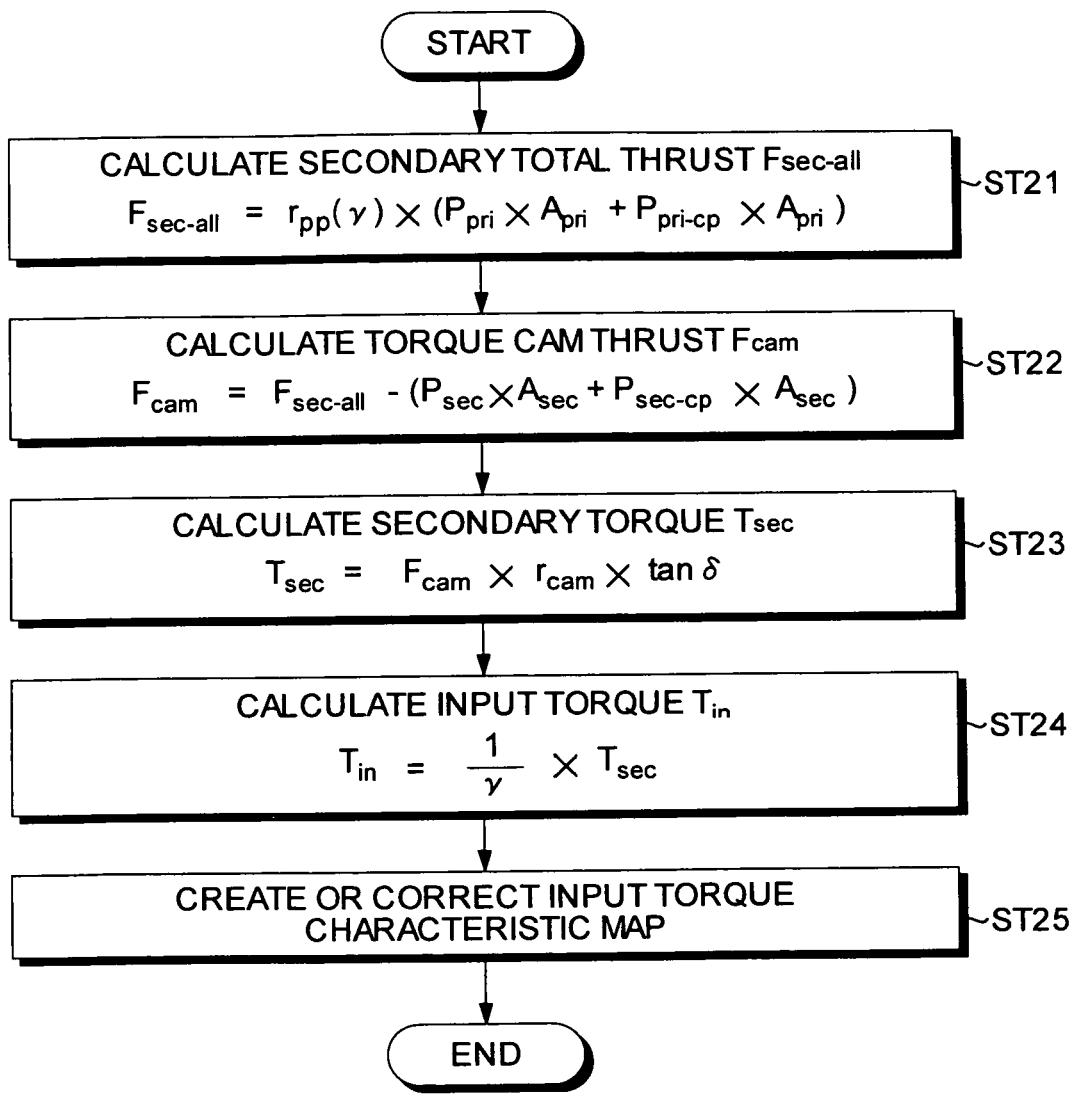
FIG. 12 is a flowchart for explaining an input torque calculation processing operation according to the first embodiment.

According to the first embodiment, the ECU C performs the processings shown in FIG. 8 or those shown in FIG. 11 using the input torque characteristic map in which the input torque $T_{in}$ has been subjected to a learning processing. In addition, the ECU C applies the primary oil pressure $P_{pri}$ or the secondary oil pressure $P_{sec}$ to the hydraulic chambers 57 and 66, thereby generating the belt pinching pressures.

According to the first embodiment, the ECU C can calculate the input torque $T_{in}$ actually input to the belt-type CVT 1 simply and accurately. Since the data on the torque cam 65 is also considered particularly when the secondary torque $T_{sec}$ is calculated, it is possible to calculate the actual input torque $T_{in}$ with higher accuracy.

The actual input torque $T_{in}$ is learned as the input torque characteristic map and stored. Therefore, the actual input torque $T_{in}$ can be estimated with high accuracy at the step ST1 shown in FIG. 8 or the step ST11 shown in FIG. 11 based on the number of revolutions of the engine Ne and the throttle opening $\theta_{th}$. The belt pinching pressures sufficient to keep the gear ratio γ can be, therefore, generated.

This can, in turn, suppress the generation of excessive belt pinching pressures. Accordingly, the driving loss among the belt 80, the primary pulley 50, and the secondary pulley 60 can be reduced, and the durability of the belt 80 can be improved. Furthermore, it is conventionally required to apply high oil pressure to the hydraulic chambers 57 and 66 in light of the difference between the output torque Te(Ne, $\theta_{th}$) output from the internal combustion engine 10 and the input torque $T_{in}$ input to the belt-type CVT 1. According to the first embodiment, the excess amount can be eliminated, so that the power loss of the oil pump OP can be also reduced.

In a transient period such as acceleration, the torque is used to increase the number of revolutions of the engine Ne and the input torque $T_{in}$ input to the belt-type CVT 1 is reduced. For this reason, when the control indication primary oil pressure $P_{pri}$ or the control indication secondary oil pressure $P_{sec}$ is set using the input torque characteristic map in such a transient period, the control indication primary oil pressure $P_{pri}$ or the control indication secondary oil pressure $P_{sec}$ is set based on a higher value than the actual input torque $T_{in}$. As a result, excessive belt pinching pressures are generated, which causes not only the driving loss between the belt 80 and each of the primary pulley 50 and the secondary pulley 60 but also deterioration in the durability of the belt 80.

According to the first embodiment, by contrast, the belt pinching pressures are directly generated according to the actual input torque $T_{in}$, so that the disadvantages of the belt driving loss and the deterioration in the belt durability can be solved. Furthermore, according to the first embodiment, it suffices to generate the control indication primary oil pressure $P_{pri}$ or the control indication secondary oil pressure $P_{sec}$ necessary to keep the gear ratio γ. The power loss of the oil pump OP can be, therefore, also reduced.

As explained above, by using the ECU C, the first embodiment can exhibit various advantages such as the reduction in the driving loss as well as the generation of the optimum belt pinching pressures according to the actual input torque $T_{in}$.

Figure 14:
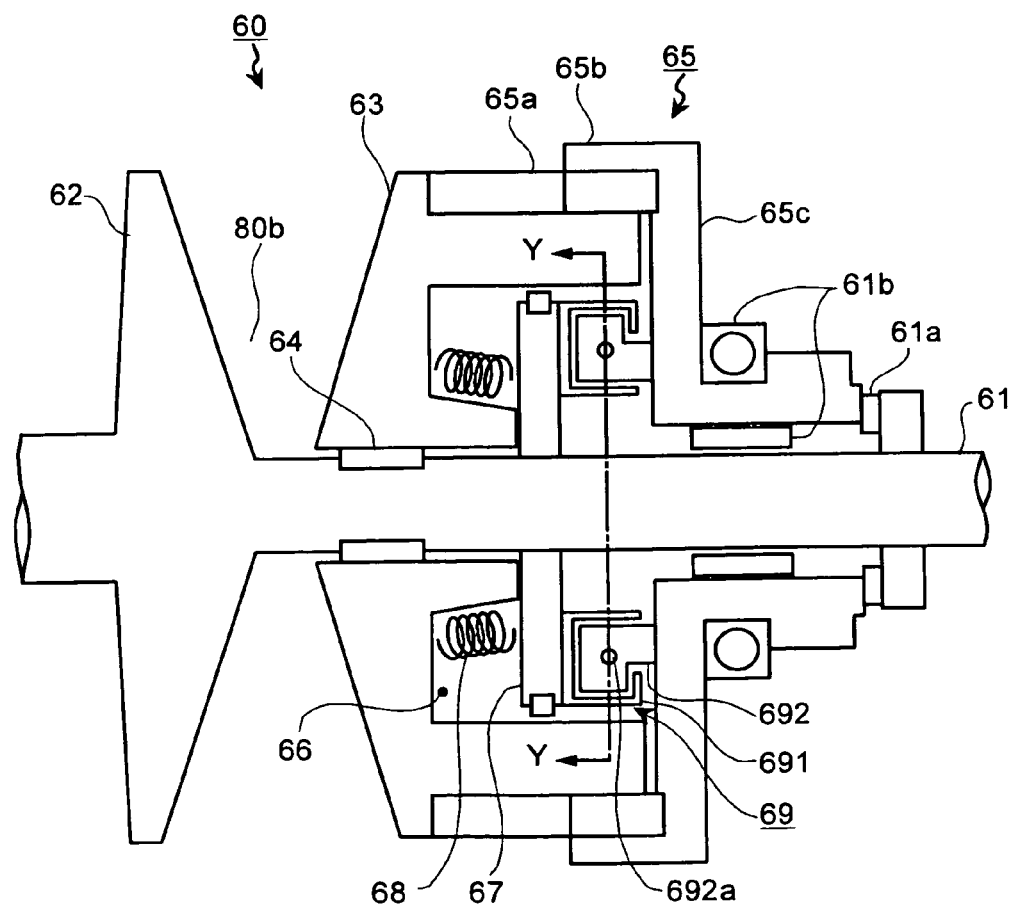
FIG. 14 is another exemplary configuration of a secondary pulley of the belt-type CVT shown in FIG. 2.
Figure 15:
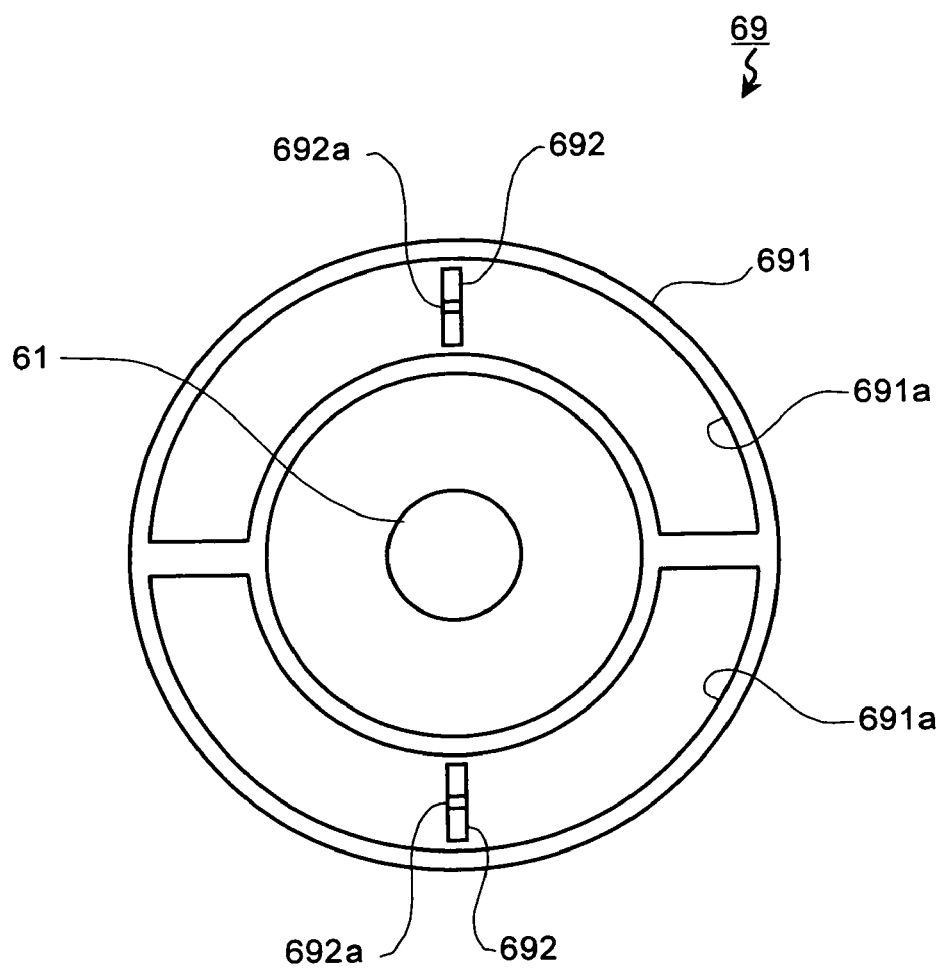
FIG. 15 is a cross section of a damping mechanism shown in FIG. 14.

The secondary pulley 60 may be equipped with a damping mechanism 69 shown in FIGS. 14 and 15.

The damping mechanism 69 includes a toroidal outer case 691 arranged in the circular member 67 and plate members 692 built on the torque cam main body 65c. The outer case 691 includes two hollow portions 691a filled with a viscous fluid (e.g., hydraulic oil) and rotates integrally with the circular member 67. Each plate member 692 has a through hole (orifice) 692a formed in its surface, and rotates integrally with the torque cam main body 65c.

The plate members 692 are arranged in the respective hollow portions 691a, and moved within the hollow portions 691a when the outer case 691 and the plate members 692 rotate relatively to one another. A gap is formed between an end of each plate member 692 and an inner wall surface of each hollow portion 691a.

By providing the gap, the plate members 692 are moved within the respective hollow portions 691a by activating the torque cam 65 during the change in the gear ratio γ. At this moment, the viscous fluid flows between the orifice 692a and the gap, thereby generating a resistance, which resistance enables the torque cam main body 65c and the movable sheave 63 to be smoothly moved relatively to each other. As a consequence, a shock generated when a lash of the torque cam 65 is reduced during the change in the gear ratio γ (when the torque cam 65 is switched over to a driven state or a non-driven state) can be reduced.

A magnitude of the resistance is adjusted by the gap between the end of the plate member 692 and the inner wall surface of the hollow portion 691a and a diameter of the orifice 692a.

The damping mechanism 69 may have a variable damping degree (damping force) according to the gear ratio γ by forming an intermediate part of the hollow portion 691a shown in FIG. 15 to be wider than both ends thereof. That is, the hollow portion 691a having a width variable in a circumferential direction is formed so that the gap between the end of the plate member 692 and the inner wall surface of the hollow portion 691a is wide when the plate member 692 is located in the intermediate part of the hollow portion 691a, and is narrower as the plate member 692 is closer to either end of the hollow portion 691a.

By doing so, a moving velocity of the plate member 692 is high when the plate member 692 is located in the intermediate part of the hollow portion 691a, and is lower as the plate member 692 is closer to the either end of the hollow portion 691a. Therefore, the damping degree (damping force) can be changed according to the gear ratio and the shock generated when the lash of the torque cam 65 is reduced can be lessened. By setting the gap so that the damping force is high in downshifting, for example, the drivability can be improved.

Since the movable sheave 63 is attached to the secondary shaft 61 through the spline 64, the movable sheave 63 is equal to the fixed sheave 62 in rotational direction and rotational velocity. The damping mechanism 69 is not always provided between the movable sheave 63 and the torque cam 65 as explained in this first embodiment but may be provided on the fixed sheave 62. In this case, the damping mechanism 69 may be constituted, for example, so that a rotation member (not shown) that rotates equally to the torque cam main body 65c is provided on an opposite of the fixed sheave 62 to the groove 80b, the plate member 692 is attached to the rotation member, and that the outer case 691 is attached to the fixed sheave 62. The rotation member may be provided independently of the torque cam 65, for example, provided as an extension of the torque cam main body 65c.

Figure 16:
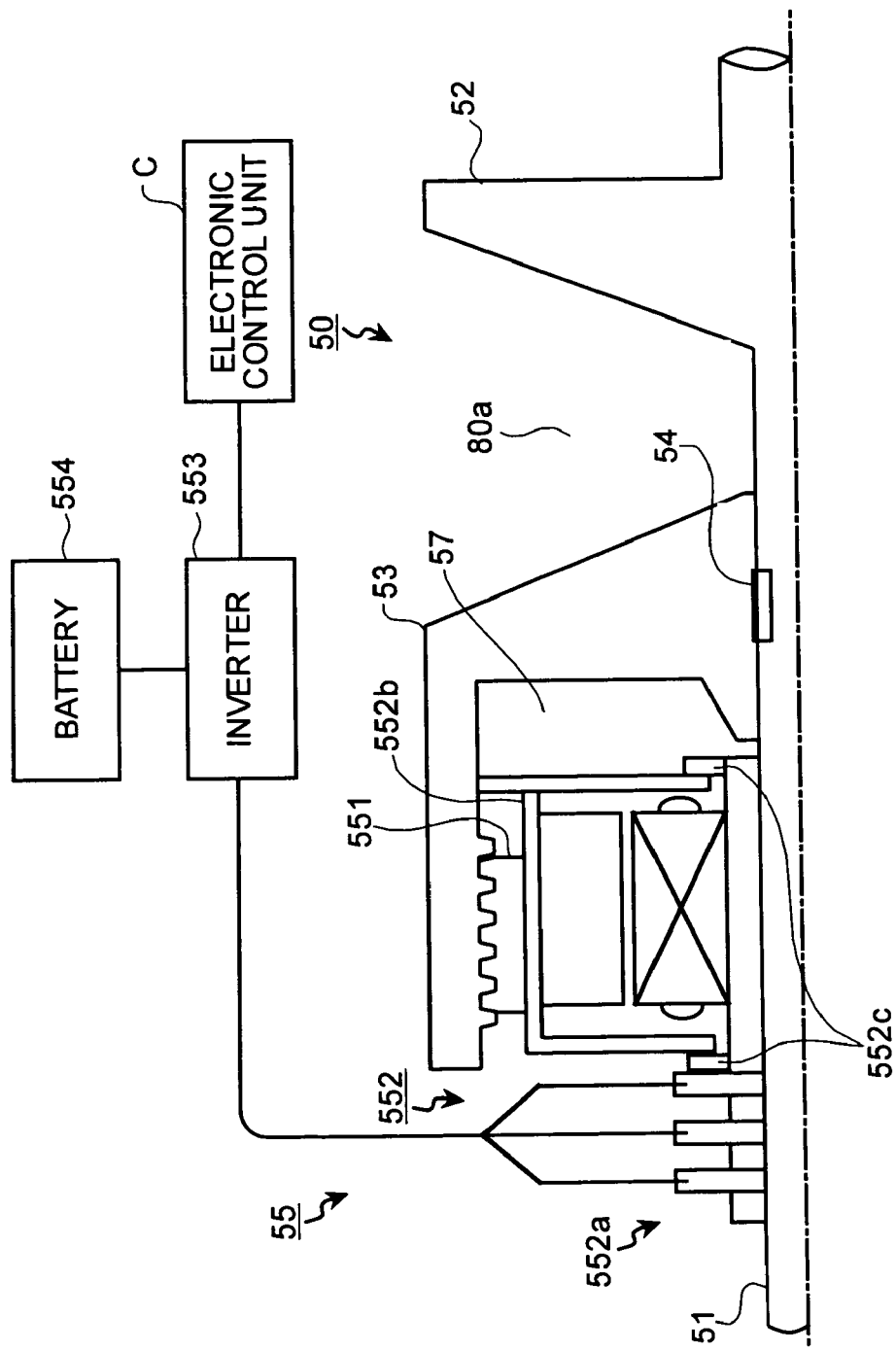
FIG. 16 is another exemplary configuration of a primary pulley.

The vane hydraulic motor 550 of the movable sheave sliding mechanism 55 may be replaced by an electric motor 552 shown in FIG. 16.

The electric motor 552 is arranged in a space portion of the movable sheave 53 opposite to the groove 80a concentrically with the primary shaft 51. The electric motor 552 supplies a current to a three-phase alternating current brush 552a connected to a battery 554 through an inverter 553, thereby rotating an outer rotor 552b relatively to the primary shaft 51 through a bearing 552c. The electric motor 552 switches over a rotation to a forward rotation or a reverse rotation by making the ECU C control the current supplied to the three-phase alternating current brush 552a.

The same motion direction conversion mechanism 551 is provided between an outer periphery of the outer rotor 552b and an inner wall surface of the space of the movable sheave 53. Due to this, the movable sheave 53 can be slid in the axial direction of the primary shaft 51 by driving the electric motor 552.

Even if the electric motor 552 is employed, the ECU C performs the same control processing as that when the vane hydraulic motor 550 is employed and the same advantages are attained.

A belt-type CVT control device according to a second embodiment of the present invention is explained next with reference to a flowchart shown in FIG. 17.

The belt-type CVT 1 according to the second embodiment has almost the same configuration as the belt-type CVT 1 according to the first embodiment with a difference in the processing performed by the ECU C.

Figure 17:
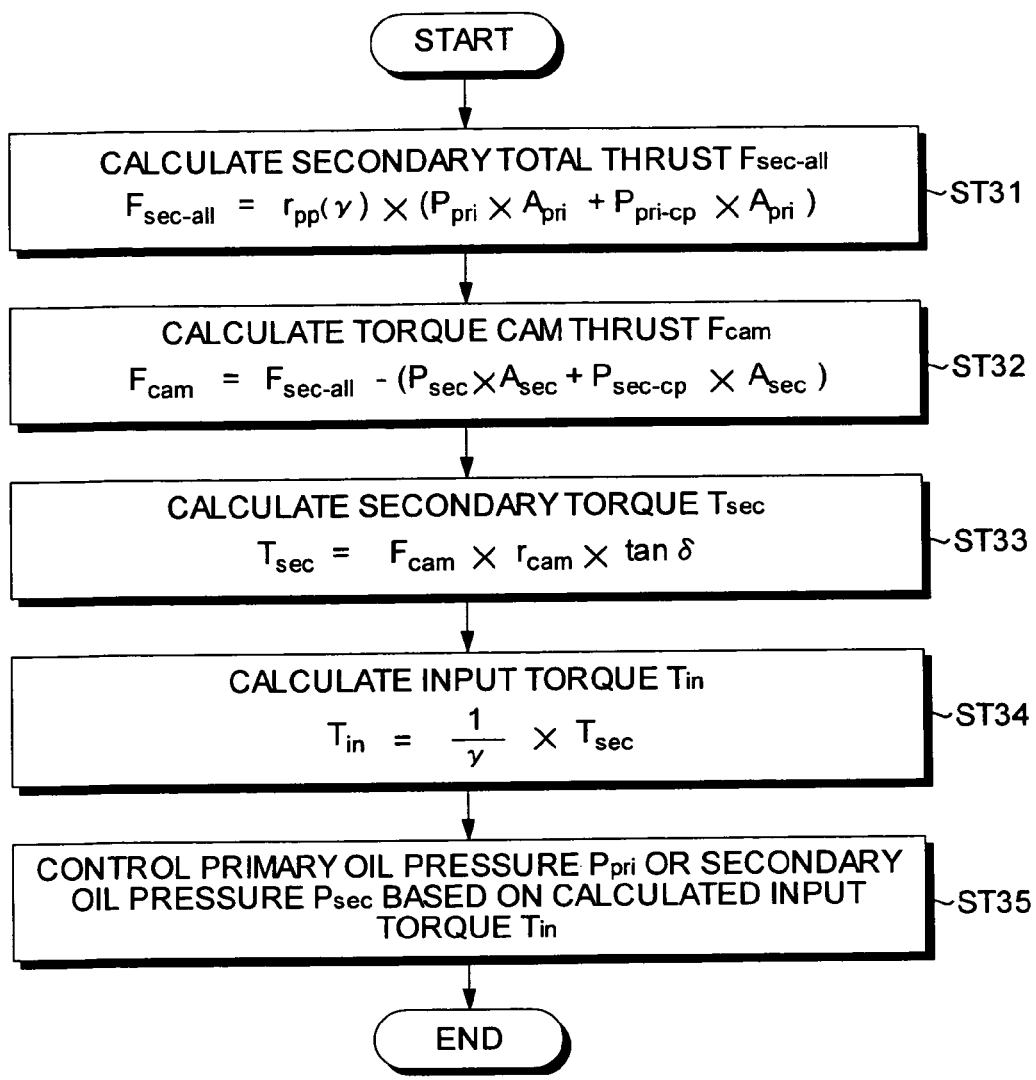
FIG. 17 is a flowchart for explaining an input torque calculation processing operation performed by a control device according to a second embodiment of the present invention.

That is, in the second embodiment, the ECU C performs the same processings as those at the steps ST21 to ST24 according to the first embodiment shown in the flowchart of FIG. 8, as shown in the flowchart of FIG. 17, thereby calculating the input torque $T_{in}$ actually input to the belt-type CVT 1 (at steps ST31 to ST34).

According to the first embodiment, the input torque is then subjected to the learning processing, the processings shown in FIG. 8 or FIG. 11 are performed using the input torque characteristic map, and the control indication primary oil pressure $P_{pri}$ or the control indication secondary oil pressure $P_{sec}$ is applied to the hydraulic chambers 57 and 66.

According to the second embodiment, by contrast, the actual input torque $T_{in}$ is calculated, and then the oil pressure applied to the hydraulic chambers 57 and 66 is directly controlled using this input torque $T_{in}$ (at step ST35). According to the second embodiment, the ECU C calculates the primary torque $T_{pri}$ at the step ST2 without performing the processing at the step ST1 shown in FIG. 8, subsequently performs the same calculation processing, and applies the primary oil pressure $P_{pri}$ to the hydraulic chambers 57 and 66. Alternatively, the ECU C calculates the secondary-torque $T_{sec}$ at the step ST12 without performing the processing at the step ST11 shown in FIG. 11, subsequently performs the same calculation processing, and applies the secondary oil pressure $P_{sec}$ to the hydraulic chambers 57 and 66.

According to the second embodiment, therefore, the control indication primary oil pressure $P_{pri}$ or the control indication secondary oil pressure $P_{sec}$ can be set with higher accuracy according to the actual input torque $T_{in}$, and more optimum belt pinching pressures can be generated.

In the transient period such as acceleration, the torque is used to increase the number of revolutions of the engine Ne and the input torque $T_{in}$ input to the belt-type CVT 1 is reduced. For this reason, when the control indication primary oil pressure $P_{pri}$ or the control indication secondary oil pressure $P_{sec}$ is set using the input torque characteristic map in such a transient period, the control indication primary oil pressure $P_{pri}$ or the control indication secondary oil pressure $P_{sec}$ is set based on a higher value than the actual input torque $T_{in}$. As a result, excessive belt pinching pressures are generated, which causes not only the driving loss between the belt 80 and each of the primary pulley 50 and the secondary pulley 60 but also deterioration in the durability of the belt 80.

According to the second embodiment, however, the belt pinching pressures are directly generated according to the actual input torque $T_{in}$, so that the disadvantages of the belt driving loss and the deterioration in the belt durability can be solved. Furthermore, according to the second embodiment, it suffices to generate the control indication primary oil pressure $P_{pri}$ or the control indication secondary oil pressure $P_{sec}$ necessary to keep the gear ratio γ. The power loss of the oil pump OP can be, therefore, also reduced.

A belt-type CVT control device according to a third embodiment of the present invention is explained next. The belt-type CVT 1 according to the third embodiment differs from the belt-type CVT 1 according to the first embodiment in the following respects.

According to the first embodiment, equal oil pressure is applied to the hydraulic chamber 57 of the primary pulley 50 and the hydraulic chamber 66 of the secondary pulley 60 from the pinching pressure regulation valve 58. This can lead to various advantages including simplification of the oil pressure control circuit. From viewpoints of the belt pinching pressures, however, it is preferable to apply independent oil pressures to the hydraulic chamber 57 of the primary pulley 50 and the hydraulic chamber 66 of the secondary pulley 60 so as to control the belt pinching pressures more accurately.

According to the third embodiment, therefore, the pinching pressure regulation valve 58 is constituted so that the oil pressures applied to the hydraulic chamber 57 of the primary pulley 50 and the hydraulic chamber 66 of the secondary pulley 60 can be individually controlled, or the pinching pressure regulation valve 58 is dedicated to the hydraulic chamber 57 and another pinching pressure regulation valve dedicated to the hydraulic chamber 66 is provided.

The ECU C according to the third embodiment generates the belt pinching pressure on the primary pulley 50 by the control indication primary oil pressure $P_{pri}$ generated by the processings shown in FIG. 8. In addition, the ECU C generates the belt pinching pressure on the secondary pulley 60 by the control indication secondary oil pressure $P_{sec}$ generated by the processings shown in FIG. 11.

As a result, according to the third embodiment, the belt pinching pressure on the primary pulley 50 and that on the secondary pulley 60 can be controlled more strictly.

A belt-type CVT control device according to a fourth embodiment of the present invention is explained next.

According to the fourth embodiment, the belt-type CVT 1 is configured by constituting the belt-type CVT 1 according to the second embodiment similarly to the belt-type CVT 1 according to the third embodiment.

That is, the pinching pressure regulation valve 58 is constituted so that the oil pressures applied to the hydraulic chamber 57 of the primary pulley 50 and the hydraulic chamber 66 of the secondary pulley 60 can be individually controlled. Alternatively, the pinching pressure regulation valve 58 is dedicated to the hydraulic chamber 57 and another pinching pressure regulation valve dedicated to the hydraulic chamber 66 is provided. Further, the ECU C is constituted so as to generate the belt pinching pressure on the primary pulley 50 by the control indication primary oil pressure $P_{pri}$ generated by the processings shown in FIG. 8. In addition, the ECU C is constituted so as to generate the belt pinching pressure on the secondary pulley 60 by the control indication secondary oil pressure $P_{sec}$ generated by the processings shown in FIG. 11.

By so constituting, the fourth embodiment can exhibit not only the same advantages as those of the second embodiment but also control the belt pinching pressure on the primary pulley 50 and that on the secondary pulley 60 more strictly similarly to the third embodiment.

Figure 18:
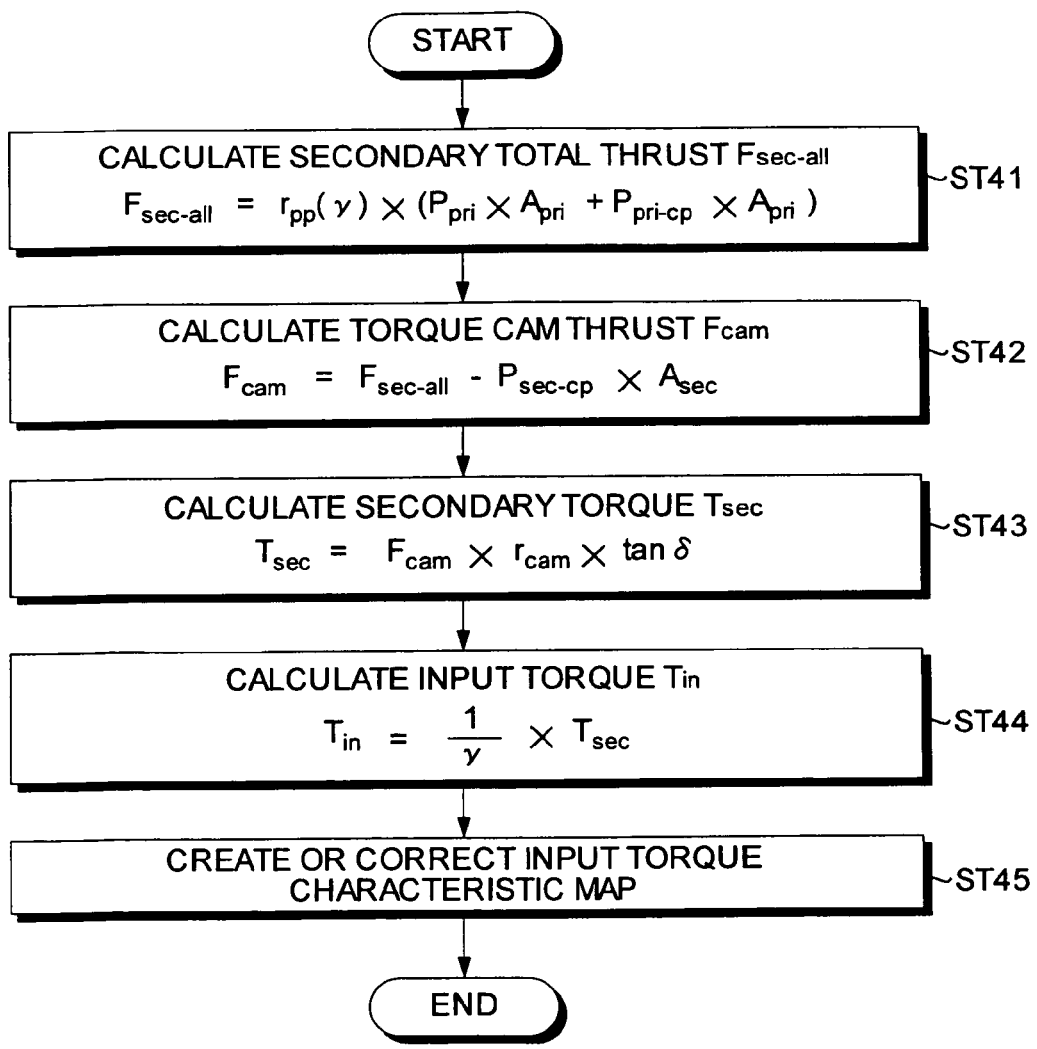
FIG. 18 is a flowchart for explaining an input torque calculation processing operation performed by a control device according to a fifth embodiment of the present invention.

A belt-type CVT control device according to a fifth embodiment of the present invention is explained next with reference to a flowchart shown in FIG. 18.

The belt-type CVT 1 according to the fifth embodiment is constituted similarly to the belt-type CVT 1 according to the third embodiment except that data (e.g., the cam fitting radius $r_{cam}$ and the cam angle $\delta$) on the torque cam 65 is set to generate the belt pinching pressures enough to be able keep a predetermined gear ratio γ only by the torque cam 65 when the gear ratio γ is the predetermined gear ratio. To do so, the input torque deriving arrangement of the ECU C according to the fifth embodiment controls the pinching pressure regulation valve 58 or the pinching pressure regulation valve dedicated to the hydraulic chamber 66 so as to stop applying the oil pressure to the hydraulic chamber 66 or so as to apply the oil pressure at which the belt pinching pressure is not generated to the hydraulic chamber 66 when the gear ratio γ is the predetermined gear ratio γ. In addition, the input torque deriving arrangement calculates the input torque $T_{in}$ as follows at least once or at predetermined intervals.

The input torque deriving arrangement of the ECU C according to the fifth embodiment calculates the input torque $T_{in}$ actually input to the belt-type CVT 1 as follows.

The ECU C according to the fifth embodiment calculates the secondary total thrust $F_{sec-all}$ generated by the secondary pulley 60 based on the oil pressure in the hydraulic chamber 57 of the primary pulley 50 when the gear ratio γ is equal to the predetermined gear ratio similarly to the third embodiment (at step ST41). In addition, the ECU C calculates the torque cam thrust $F_{cam}$ (at step ST42).

While the gear ratio γ is equal to the predetermined gear ratio γ, the belt pinching pressure on the secondary pulley 60 is generated only by the torque cam 65. The ECU C, therefore, calculates the torque cam thrust $T_{cam}$ based on the following Equation (17) in which the secondary hydraulic thrust $F_{sec-p}$ is zero in the Equation (14).

[Equation 17]

$$F_{cam} = F_{sec-all} - F_{sec-cp} \qquad (17)$$

Thereafter, the ECU C performs the same calculation processings as those at the steps ST23 to ST25 according to the third embodiment to calculate the input torque $T_{in}$, and creates or corrects the input torque characteristic map.

According to the fifth embodiment, the number of the parameter required for the calculation processings can be reduced (that is, the secondary hydraulic thrust $F_{sec-p}$ is unnecessary), as compared with the third embodiment. The fifth embodiment can, therefore, not only exhibit the same advantages as those of the third embodiment but can also calculate the input torque $T_{in}$ more simply and more promptly.

In the first to the fifth embodiments, an example in which the motor (hydraulic motor 550 or electric motor 552) is provided integrally with the movable sheave 53 of the primary pulley 50 has been explained. However, the present invention is not limited to this example. The motor may be provided integrally with, for example, the movable sheave 63 of the secondary pulley 60, or the movable sheaves 53 and 63 of both the primary pulley 50 and the secondary pulley 60.

In the first to the fifth embodiments, the torque cam 65 is provided on the secondary pulley 60. Alternatively, the torque cam 65 may be provided on the primary pulley 50 or on each of the primary pulley 50 and the secondary pulley 60.

The belt-type CVT control device according to the present invention can accurately calculate the input torque actually input to the belt-type CVT and can, therefore, generate the optimum belt pinching pressures according to the input torque.

Thus, the belt-type CVT control device according to the present invention is a useful technique for generating an optimum belt pinching pressures according to the input torque actually input to the belt-type CVT.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device for controlling a belt-type continuously variable transmission, wherein said belt-type continuously variable transmission comprises:

two pulley shafts arranged in parallel at a predetermined distance;

movable sheaves arranged on the pulley shafts and slidable on corresponding pulley shafts in axial directions of the pulley shafts, respectively;

fixed sheaves arranged on the corresponding pulley shafts to face corresponding movable sheaves so as to form grooves between the fixed sheaves and the movable sheaves, respectively;

a belt wound on the grooves between the movable sheaves and the fixed sheaves facing one another;

a first actuator that is provided to a one of the movable sheaves so as to press the one movable sheave toward a corresponding one of the fixed sheaves to generate a belt pinching pressure on the one movable sheave;

a second actuator and a torque cam that are provided to an other movable sheave so as to press the other movable sheave toward an other fixed sheave to generate a belt pinching pressure on the other movable sheave; and an electronic control unit including an input torque deriving arrangement that derives an input torque actually input to the belt-type continuously variable transmission based on an output torque of the belt-type continuously variable transmission and a gear ratio of the belt-type continuously variable transmission, compares the derived input torque actually input to the belt-type continuously variable transmission with an input torque from an internal combustion engine obtained based on an engine torque characteristic map, and corrects input torque information of the engine torque characteristic map when the derived input torque actually input to the belt-type continuously variable transmission differs from the input torque from the internal combustion engine, wherein the output torque output from the belt-type continuously variable transmission is calculated based on a control amount of the first actuator which is related to an oil pressure of the first actuator.

2. The control device according to claim 1, wherein the input torque deriving arrangement calculates a thrust of the other movable sheave based on the control amount of the first actuator, calculates a thrust of the torque cam from the thrust of the other movable sheave and a thrust of the second actuator calculated based on a control amount of the second actuator, calculates a torque cam transmission torque from the thrust of the torque cam and data on the torque cam, and derives the input torque actually input to the belt-type continuously variable transmission based on the torque cam transmission torque.

3. The control device according to claim 1, wherein the input torque deriving arrangement calculates a thrust of the other movable sheave based on the control amount of the first actuator, calculates a thrust of the torque cam from the thrust of the other movable sheave and a thrust of the second actuator calculated based on a control amount of the second actuator, calculates a torque cam transmission torque from the thrust of the torque cam and data on the torque cam, derives the input torque actually input to the belt-type continuously variable transmission based on the torque cam transmission torque, and updates the input torque as a new input torque.

4. The control device according to claim 1, wherein the input torque deriving arrangement calculates a thrust of the other movable sheave based on the control amount of the first actuator, calculates a thrust of the torque cam from the thrust of the other movable sheave and a thrust of the second actuator calculated based on a control amount of the second actuator, calculates a torque cam transmission torque from the thrust of the torque cam and data on the torque cam, and derives the input torque actually input to the belt-type continuously variable transmission based on the torque cam transmission torque, and the control device further includes an actuator control arrangement that controls the control amounts of the first actuator and the second actuator based on the input torque calculated by the input torque deriving arrangement.

5. The control device according to claim 1, wherein the input torque deriving arrangement calculates a thrust of the one movable sheave by adding up a thrust of the first actuator generated by an applied oil pressure and a centrifugal oil pressure caused by a hydraulic oil within the first actuator, calculates a thrust of the other movable sheave by multiplying the thrust of the one movable sheave by a ratio according to a gear ratio of the thrust of the other movable sheave to the thrust of the one movable sheave, calculates a thrust of the torque cam from the thrust of the other movable sheave and a thrust of the second actuator calculated based on the oil pressure within the second actuator, calculates a torque cam transmission torque from the thrust of the torque cam and data on the torque cam, and derives the input torque actually input to the belt-type continuously variable transmission based on the torque cam transmission torque and the gear ratio.

6. The control device according to claim 1, wherein the input torque deriving arrangement controls a control amount of the second actuator so that the second actuator does not press the other movable sheave when a gear ratio is equal to a predetermined gear ratio, calculates a thrust of the torque cam responsible for generation of the belt pinching pressure on the other movable sheave based on the control amount of the first actuator, calculates a torque cam transmission torque from the thrust of the torque cam and data on the torque cam, and derives the input torque actually input to the belt-type continuously variable transmission based on the torque cam transmission torque.

7. The control device according to claim 1, wherein the input torque deriving arrangement controls a control amount of the second actuator so that the second actuator does not press the other movable sheave when a gear ratio is equal to a predetermined gear ratio, calculates a thrust of the torque cam responsible for generation of the belt pinching pressure on the other movable sheave based on the control amount of the first actuator, calculates a torque cam transmission torque from the thrust of the torque cam and data on the torque cam, derives the input torque actually input to the belt-type continuously variable transmission based on the torque cam transmission torque, and updates the input torque as a new input torque.

8. The control device according to claim 1, wherein the input torque deriving arrangement controls a control amount of the second actuator so that the second actuator does not press the other movable sheave when a gear ratio is equal to a predetermined gear ratio, calculates a thrust of the one movable sheave by adding up a thrust of the first actuator generated by an applied oil pressure and a centrifugal oil pressure caused by a hydraulic oil within the first actuator, calculates a thrust of the other movable sheave by multiplying the thrust of the one movable sheave by a ratio according to a gear ratio of the thrust of the other movable sheave to the thrust of the one movable sheave, calculates a thrust of the torque cam responsible for generation of the belt pinching pressure on the other movable sheave side by subtracting the centrifugal oil pressure caused by the hydraulic oil within the second actuator from the thrust of the other movable sheave, calculates a torque cam transmission torque from the thrust of the torque cam and data on the torque cam, and derives the input torque actually input to the belt-type continuously variable transmission based on the torque cam transmission torque.

9. The control device according to claim 1, further comprising an actuator control arrangement that controls the control amount of the first actuator and a control amount of the second actuator based on the input torque calculated by the input torque deriving arrangement.

10. The control device according to claim 1, further comprising:
an actuator control arrangement that calculates a necessary total thrust necessary for the one movable sheave based on the input torque calculated by the input torque deriving arrangement, and controls the control amount of the first actuator and a control amount of the second actuator based on the control amount of the first actuator that generates the necessary total thrust.

11. The control device according to claim 1, further comprising an actuator control arrangement that calculates a necessary total thrust necessary for the one movable sheave based on the input torque calculated by the input torque deriving arrangement and a frictional force between each of the one movable sheave and the fixed sheave and the belt, and controls the control amount of the first actuator and a control amount of the second actuator based on the control amount of the first actuator that generates the necessary total thrust.

12. The control device according to claim 1, further comprising an actuator control arrangement that calculates a necessary total thrust necessary for the other movable sheave and a thrust of the torque cam based on the input torque calculated by the input torque deriving arrangement, calculates a thrust of the second actuator from the necessary total thrust and the thrust of the torque cam, and controls the control amount of the first actuator and a control amount of the second actuator based on the control amount of the second actuator that generates the thrust of the second actuator.

13. The control device according to claim 1, wherein the input torque deriving arrangement calculates the output torque output from the belt-type continuously variable transmission based on an oil pressure that presses the other moveable sheave toward the other fixed sheave.

14. A method for controlling a belt-type continuously variable transmission, wherein the belt-type continuously variable transmission includes
two pulley shafts arranged in parallel at a predetermined distance;
movable sheaves arranged on the pulley shafts and slidable on corresponding pulley shafts in axial directions of the pulley shafts, respectively;
fixed sheaves arranged on the corresponding pulley shafts to face corresponding movable sheaves so as to form grooves between the fixed sheaves and the movable sheaves, respectively;
a belt wound on the grooves between the movable sheaves and the fixed sheaves facing one another;
a first actuator that is provided to a one of the movable sheaves so as to press the one movable sheave toward a corresponding one of the fixed sheaves to generate a belt pinching pressure on the one movable sheave;
a second actuator and a torque cam that are provided to an other movable sheave so as to press the other movable sheave toward an other fixed sheave to generate a belt pinching pressure on the other movable sheave; and
an electronic control unit, the method comprising:
deriving, using the electronic control unit, an input torque actually input to the belt-type continuously variable transmission based on an output torque of the belt-type continuously variable transmission and a gear ratio of the belt-type continuously variable transmission,
wherein the deriving includes
calculating the output torque output from the belt-type continuously variable transmission based on a control amount of the first actuator which is related to an oil pressure of the first actuator,
comparing the derived input torque actually input to the belt-type continuously variable transmission with an input torque from an internal combustion engine obtained based on an engine torque characteristic map, and
correcting input torque information of the engine torque characteristic map when the derived input torque actually input to the belt-type continuously variable transmission differs from the input torque from the internal combustion engine.

15. The method according to claim 14, wherein
the deriving includes calculating a thrust of the other movable sheave based on the control amount of the first actuator, calculating a thrust of the torque cam from the thrust of the other movable sheave and a thrust of the second actuator calculated based on a control amount of the second actuator, calculating a torque cam transmission torque from the thrust of the torque cam and data on the torque cam, and deriving the input torque actually input to the belt-type continuously variable transmission based on the torque cam transmission torque.

16. The method according to claim 14, wherein
the deriving includes controlling a control amount of the second actuator so that the second actuator does not press the other movable sheave when a gear ratio is equal to a predetermined gear ratio, calculating a thrust of the torque cam responsible for generation of the belt pinching pressure on the other movable sheave based on the control amount of the first actuator, calculating a torque cam transmission torque from the thrust of the torque cam and data on the torque cam, and deriving the input torque actually input to the belt-type continuously variable transmission based on the torque cam transmission torque.

17. The method according to claim 14, further comprising controlling the control amount of the first actuator and a control amount of the second actuator based on the input torque calculated by the input torque deriving arrangement.

18. The method according to claim 14, wherein the calculating the output torque output from the belt-type continuously variable transmission is based on an oil pressure that presses the other moveable sheave toward the other fixed sheave.

* * * * *